United States Patent
Katayama

(10) Patent No.: US 6,804,180 B2
(45) Date of Patent: Oct. 12, 2004

(54) OPTICAL HEAD ASSEMBLY AND OPTICAL INFORMATION RECORDING/REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 624 days.

(21) Appl. No.: 09/828,903

(22) Filed: Apr. 10, 2001

(65) Prior Publication Data

US 2001/0030917 A1 Oct. 18, 2001

(30) Foreign Application Priority Data

Apr. 14, 2000 (JP) .................................. 2000-113556

(51) Int. Cl.$^7$ .................................................. G11B 7/00
(52) U.S. Cl. ................................. 369/44.32; 369/53.19
(58) Field of Search ........................ 369/44.11, 44.14, 369/44.23, 44.32, 44.41, 53.11, 53.14, 53.19, 53.23, 53.28

(56) References Cited

U.S. PATENT DOCUMENTS

| | | | | |
|---|---|---|---|---|
| 5,210,730 A | | 5/1993 | Hayashi et al. | 369/44.37 |
| 5,347,504 A | * | 9/1994 | Ito et al. | 369/44.41 |
| 5,859,819 A | | 1/1999 | Miyabe et al. | 369/44.41 |
| 6,327,240 B1 | * | 12/2001 | Tobita et al. | 369/53.19 |
| 6,507,544 B1 | * | 1/2003 | Ma et al. | 369/44.41 |
| 6,510,111 B2 | * | 1/2003 | Matsuura | 369/44.32 |
| 6,611,482 B2 | * | 8/2003 | Ma et al. | 369/53.19 |

FOREIGN PATENT DOCUMENTS

| | | |
|---|---|---|
| JP | 06-251404 | 9/1994 |
| JP | 06-290464 | 10/1994 |
| JP | 09-147395 | 6/1997 |
| JP | 9-161293 | 6/1997 |
| JP | 11-191980 | 6/1999 |
| JP | 2000-21014 | 1/2000 |
| JP | 2001-273660 | 10/2001 |

OTHER PUBLICATIONS

Japanese office action dated Jul. 8, 2003 with English translation of pertinent portions.
Japanese Office Action with English translation of pertinent portions.
N. Murao, et al., "Two Servo Using a Liquid Crystal Device", ISOM/ODS 1996, Technical Digest.

* cited by examiner

*Primary Examiner*—Thang V. Tran
*Assistant Examiner*—Bach Vuong
(74) *Attorney, Agent, or Firm*—Whitham, Curtis & Christofferson P.C.

(57) ABSTRACT

To improve a tilt detection sensitivity and to detect a tangential tilt of recordable and rewritable optical recording media where no signal is recorded previously, An optical head assembly includes a semiconductor laser 6, an objective lens 5 which focuses a laser beam onto a disk D, and a photodetector 9 adapted to receive reflected light from the disk D. The photodetector 9 includes light receiving elements 18 to 33 each of which individually receives light components of the reflected light from the disk D directed to regions on one side in the tangential direction T of the disk D and on both sides in the radial direction R thereof, light components of the reflected light from the disk D directed to regions on the other side in the tangential direction T of the disk D and intermediate in the radial direction R thereof, light components of the reflected light from the disk D directed to regions on one side in the tangential direction T of the disk D and intermediate in the radial direction R thereof, and light components of the reflected light from the disk D directed to regions on the other side in the tangential direction T of the disk D and on both sides in the radial direction R thereof.

15 Claims, 20 Drawing Sheets

OPTICAL HEAD ASSEMBLY AND OPTICAL INFORMATION RECORDING/ REPRODUCING DEVICE

BACKGROUND OF THE INVENTION

1. Field of the Invention

The present invention relates to an optical head assembly for recording and reproducing data on and from an optical disk medium and to an optical information recording/ reproducing device. In particular, the present invention relates to an optical head assembly and an optical information recording/reproducing device with which tangential tilt of optical recording media can be detected.

2. Description of the Prior Art

Recording density obtained in optical information recording/reproducing devices is in inverse proportion to the square of the diameter of focused light spots formed on an optical recording medium with an optical head assembly. Thus, the smaller the diameter of the focused light spot is, the higher the recording density is. The diameter of the focused light spot is in inverse proportion to the numerical aperture of the objective lens in the optical head assembly. Thus, the higher the numerical aperture of the objective lens is, the smaller the diameter of the focused light spot is.

Tilting of the optical recording medium in a tangential direction relative to the objective lens deforms the focused light spots due to coma aberration for which the substrate of the optical recording medium is responsible, badly affecting recording/reproducing properties. The coma aberration is in proportion to the cubic of the numerical aperture of the objective lens. Thus, the higher the numerical aperture of the objective lens is, the smaller a margin for the tangential tilt of the optical recording medium with respect to the recording/reproducing properties is. Accordingly, it is necessary to detect and correct the tangential tilt of optical recording media to avoid degradation of recording/ reproducing properties in optical head assemblies and optical information recording/reproducing device that employ an objective lens with a higher numerical aperture for a higher recording density.

FIG. 17 shows a configuration of a conventional optical head assembly with which the tangential tilt of optical recording media can be detected. This optical head assembly is disclosed in Japanese Patent Laid-Open No. 9-161293. The light beam emitted from a semiconductor laser 105 is converted into parallel rays with a collimator lens 106. The parallel rays are then incident on a diffraction grating 107 where they are divided into the zero order diffracted beam, the plus first order diffracted beam and the minus first order diffracted beam.

These beams are directed to a half mirror 108 where about 50% of the light is passed through it and are focused on a disk D by an objective lens 109. The three beams reflected from the disk D are transmitted through the objective lens 109 in the opposite direction, about 50% of which are reflected from the half mirror 108. The reflected light is passed through a cylindrical lens 111 and a lens 112, and is then received by a photodetector 113. The photodetector 113 is disposed on the midway of the line focuses of the cylindrical lens 111 and the lens 112.

FIG. 18 is a plan view of the diffraction grating 107. The diffraction grating 107 serves to impart, to the plus and minus first order diffracted beams, a coma aberration in the tangential direction of the disk D. The direction of grating in the diffraction grating 107 is generally in parallel with the radial direction of the disk D. A grating pattern is such that the upper lines (upper half in the figure) are curved upward while the lower lines (lower half in the figure) are curved downward.

FIG. 19 shows location of the focused light spots on the disk D. Focused light spots L115, L116, and L117 correspond to the zero order diffracted beam, the plus first order diffracted beam and the minus first order diffracted beam, respectively, from the diffraction grating 107. These spots are located on the same track D1 where pits are formed. The focused light spots L116 and L117 have side lobes on upper and lower sides thereof, respectively, in the tangential direction of the disk D.

FIG. 20 shows a pattern of light receiving elements of the photodetector 113 and location of the focused light spots on the photodetector 113. A light spot L124 corresponds to the zero order diffracted beam from the diffraction grating 107 and is received by light receiving elements 118 to 121 which are four divisions defined by the dividing line parallel to the tangential direction of the disk D traversing across the optical axis and the other dividing line parallel to the radial direction. A light spot L125 corresponds to the plus first order diffracted beam from the diffraction grating 107 and is received by a single light receiving element 122. A light spot L126 corresponds to the minus first order diffracted beam from the diffraction grating 107 and is received by a single light receiving element 123. The row of the focused light spots L115 to L117 on the disk D is oriented in the tangential direction while the row of the light spots L124 to L126 on the photodetector 113 is oriented in the radial direction due to an effect of the cylindrical lens 111 and the lens 112 (the up-and-down direction corresponds to the radial direction and the side-to-side direction corresponds to the tangential direction in FIG. 20).

The outputs from the light receiving elements 118 to 123 are herein represented by V118 to V123, respectively. A focus error signal may be obtained, using the astigmatic method, from the following arithmetic operation:

(V118+V121)−(V119+V120).

A tracking error signal may be obtained, using the pushpull method, from the following arithmetic operation:

(V118+V120)−(V119+V121).

A playback signal produced by the focused light spot L115 may be obtained from the following arithmetic operation:

V118+V119+V120+V121.

The tangential tilt of the disk D may be detected by either one of the following two approaches. The first approach is to obtain a tangential tilt signal by subtracting V123 from V122. The second approach is to obtain a tangential tilt signal according to a difference in bit error rates of a playback signal produced by the focused light spot L116 from the output V122 and a playback signal produced by the focused light spot L117 from the output V123.

When the first approach is used to detect the tangential tilt of an optical recording medium in the conventional optical head assembly, there is a defect of not being capable of detecting the tangential tilt at a high sensitivity because the change in the outputs V122 and V123 for the tangential tilt is significantly small.

On the other hand, when the second approach is used to detect the tangential tilt of the optical recording medium in the conventional optical head assembly, it is necessary to measure the bit error rates in the playback signals. The tangential tilt can be detected only with optical recording media for playback only, where such signals are recorded previously. No tangential tilt can be detected with recordable and rewritable optical recording media where no such signal is recorded previously.

BRIEF SUMMARY OF THE INVENTION

Object of the Invention

An object of the present invention is to overcome the above-mentioned problem in the conventional optical head assembly with which the tangential tilt of the optical recording media can be detected. Another object of the present invention is to provide an optical head assembly and an optical information recording/reproducing device which allows detection of the tangential tilt at a high sensitivity and with which the tangential tilt can be detected even on the recordable and rewritable optical recording media where no signal is recorded previously.

SUMMARY OF THE INVENTION

An optical head assembly according to the present invention comprises: a light source; an objective lens which focuses transmitted light from the light source onto an optical recording medium; and a photodetector adapted to receive reflected light from the optical recording medium. The photodetector has light receiving elements each of which individually receives light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium.

With the above-mentioned configuration, the reflected light from the optical recording medium is separated into the light components directed to the regions on one side in the tangential direction of the optical recording medium and on both sides in the radial direction of the optical recording medium; the light components directed to the regions on one side in the tangential direction of the optical recording medium and intermediate in the radial direction of the optical recording medium; the light components directed to the regions on the other side in the tangential direction of the optical recording medium and on both sides in the radial direction of the optical recording medium; and the light components directed to the regions on the other side in the tangential direction of the optical recording medium and intermediate in the radial direction of the optical recording medium. This allows detection of a tangential tilt (a tilt in the tangential direction, i.e., an angular change in the direction of rotation about the axis along the radial direction) of the optical recording medium according to changes in light intensity in these elements.

In other words, when there is a tangential tilt of the optical recording medium, the intensity is varied for, depending on whether the focused light spots are located on grooves or on lands (the valleys and tops of the grooves formed in the optical recording medium), the light components of the reflected light from the optical recording medium directed to the regions on one side in the tangential direction of the optical recording medium and on both sides in the radial direction of the optical recording medium; the light components thereof directed to the regions on one side in the tangential direction of the optical recording medium and intermediate in the radial direction of the optical recording medium; the light components thereof directed to the regions on the other side in the tangential direction of the optical recording medium and on both sides in the radial direction of the optical recording medium; and the light components thereof directed to the regions on the other side in the tangential direction of the optical recording medium and intermediate in the radial direction of the optical recording medium.

More specifically, when there is a positive tangential tilt of the optical recording medium and when the focused light spots are located on the grooves in the optical recording medium, or when there is a negative tangential tilt of the optical recording medium and when the focused light spots are located on the lands on the optical recording medium, the following applies.

The intensity is lower for the regions on one side in the tangential direction of the optical recording medium and on both sides in the radial direction of the optical recording medium as well as for the regions on the other side in the tangential direction of the optical recording medium and intermediate in the radial direction of the optical recording medium, than that obtained when there is no tangential tilt of the optical recording medium.

At the same time, the intensity is higher for the regions on one side in the tangential direction of the optical recording medium and intermediate in the radial direction of the optical recording medium as well as for the regions on the other side in the tangential direction of the optical recording medium and on both sides in the radial direction of the optical recording medium, than that obtained when there is no tangential tilt of the optical recording medium.

When there is a negative tangential tilt of the optical recording medium and when the focused light spots are located on the grooves in the optical recording medium, or when there is a positive tangential tilt of the optical recording medium and when the focused light spots are located on the lands on the optical recording medium, the following applies.

The intensity is higher for the regions on one side in the tangential direction of the optical recording medium and on both sides in the radial direction of the optical recording medium as well as for the regions on the other side in the tangential direction of the optical recording medium and intermediate in the radial direction of the optical recording medium, than that obtained when there is no tangential tilt of the optical recording medium.

At the same time, the intensity is lower for the regions on one side in the tangential direction of the optical recording medium and intermediate in the radial direction of the optical recording medium as well as for the regions on the other side in the tangential direction of the optical recording medium and on both sides in the radial direction of the optical recording medium, than that obtained when there is no tangential tilt of the optical recording medium.

Therefore, the tangential tilt of the optical recording medium can be detected according to the change in intensity of the light components reflected from the optical recording medium.

In the optical information recording/reproducing device according to the present invention, the above-mentioned optical head assembly is used. The driving circuit drives the tilt correction unit in response to a tangential tilt signal generated from the output of the photodetector of the optical head assembly. The tangential tilt of the optical recording medium is corrected so that any adverse effects are eliminated on recording/reproduction characteristics.

As apparent from the above, when the tangential tilt of the optical recording medium is detected in the optical head assembly and the optical information recording/reproducing device according to the present invention, the detection of the tangential tilt can be made at a high sensitivity because the intensity is varied significantly with the tangential tilt, in the light components reflected from the optical recording medium.

In addition, when the tangential tilt of the optical recording medium is detected in the optical head assembly and the optical information recording/reproducing device according to the present invention, the tangential tilt can be detected even with recordable and rewritable optical recording media where no signal is recorded previously, because the tangential tilt of the optical recording medium is detected according to the change in intensity of the light components reflected from the optical recording medium.

DETAILED DESCRIPTION OF THE PREFERRED EMBODIMENTS (First Embodiment)

Figure 1:
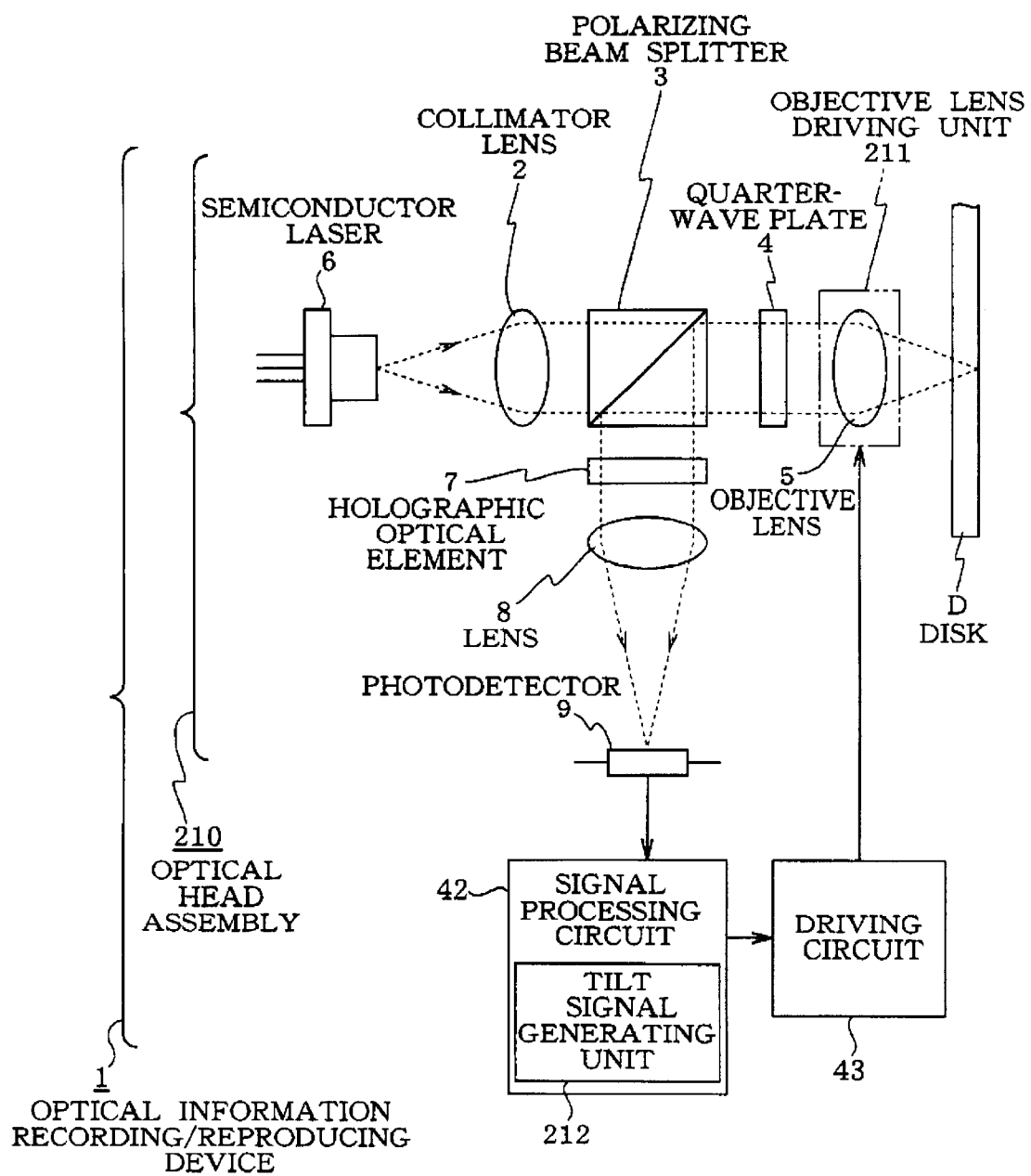
FIG. 1 is a block diagram showing a first embodiment of the present invention.

A first embodiment of the present invention will be described with reference to FIGS. 1 through 8. FIG. 1 shows a block diagram of an optical information recording/reproducing device 1 according to this embodiment. The optical information recording/reproducing device 1 comprises an optical head assembly 210, an objective lens driving unit 211 for focusing, tracking and tangential tilt correction through the optical head assembly 210, a driving circuit 43 for the objective lens driving unit 211, and a signal processing circuit 42 adapted to generate a focus error signal, a tracking error signal, a tangential tilt signal, and a playback signal, in response to outputs from a photodetector 9 which is described below.

The optical head assembly 210 comprises a semiconductor laser 6, a collimator lens 2, a polarizing beam splitter 3, a quarter-wave plate 4, an objective lens 5, the photodetector 9, a holographic optical element 7, and a lens 8. The semiconductor laser 6 serves as a light source to provide a laser beam. The collimator lens 2 converts the light emitted from the semiconductor laser 6 into parallel rays. The transmitted light from the collimator lens 2 is passed through the polarizing beam splitter 3. The quarter-wave plate 4 is used in creating circular polarization from linear polarization with the transmitted light from the polarizing beam splitter 3. The objective lens 5 focuses the transmitted light from the quarter-wave plate 4 onto a disk D. The photodetector 9 receives the reflected light from the disk D by multiple-divided light receiving surfaces to produce signals indicative of light intensities. The holographic optical element 7 and the lens 8 are disposed in front of the photodetector 9 to split the reflected light from the disk D into several components and direct them into the light receiving elements of the photodetector 9.

With the above-mentioned configuration, the light beam emitted from the semiconductor laser 6 is directed to the polarizing beam splitter 3 as P polarization. Almost 100% of the light is passed through the polarizing beam splitter 3, which is then passed through the quarter-wave plate 4 where it is converted from linear polarization to circular polarization. The light is then focused onto the disk D by the objective lens 5. The reflected light from the disk D is passed through the objective lens 5 in the opposite direction and is then directed to the quarter-wave plate 4. The quarter-wave plate 4 converts the circular polarization into linear polarization of which direction of polarization is perpendicular to that of the outgoing light. The light passed through the quarter-wave plate 4 is directed to the polarizing beam splitter 3 as S polarization. Almost 100% of the light is reflected therefrom. Most of it is diffracted as the plus first order diffracted beam by the holographic optical element 7. The diffracted beam is passed through the lens 8 and received by the photodetector 9.

Figure 2:
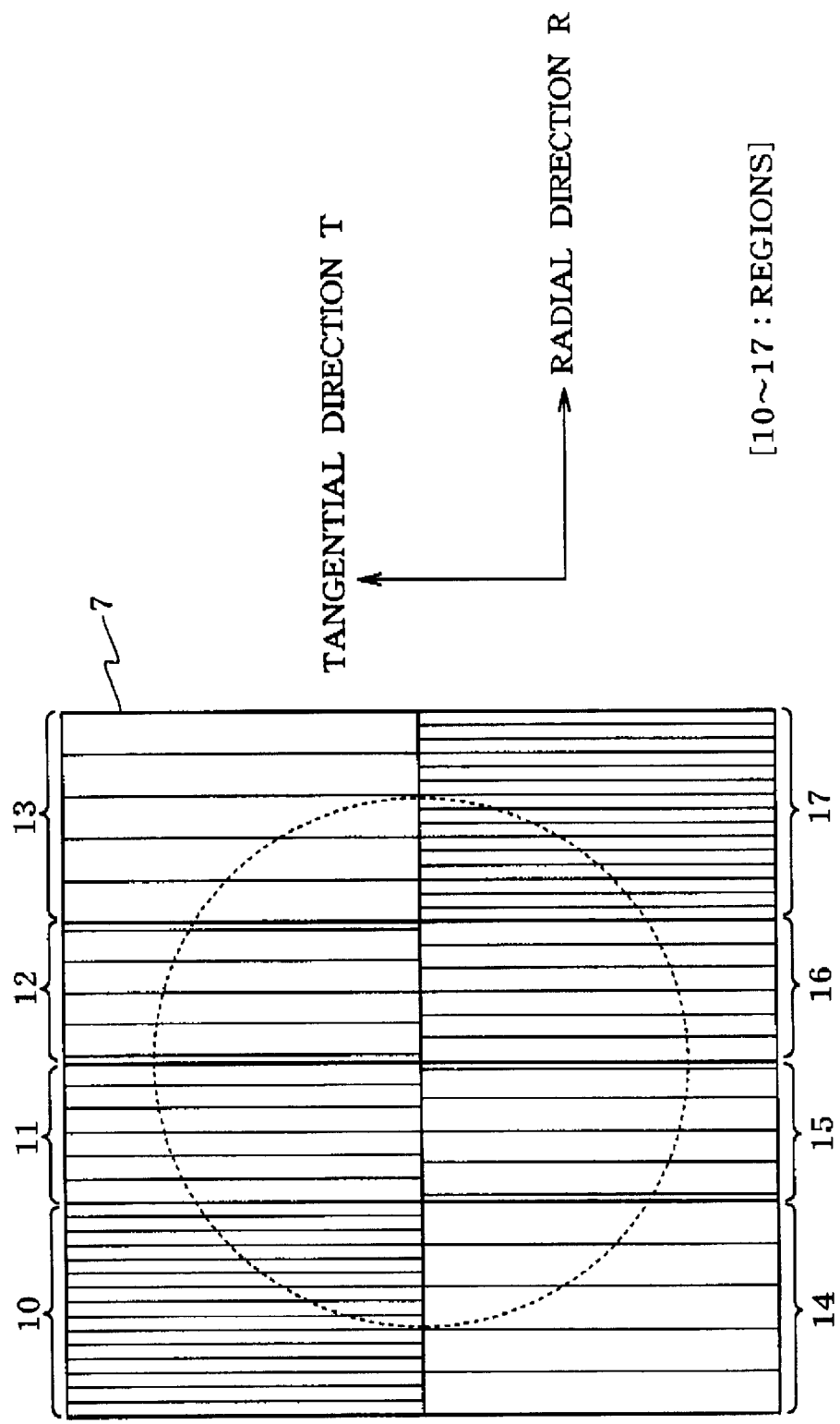
FIG. 2 is a plan view of a holographic optical element illustrated in FIG. 1.

First, the above-mentioned holographic optical element 7 will be described. FIG. 2 is a plan view of the holographic optical element 7. The holographic optical element 7 has a holographic grating on its incident surface. The holographic grating includes an effective diameter of the objective lens 5 which is indicated by a dotted circle in the figure. The holographic grating is divided into eight regions 10 to 17 by three dividing lines which are parallel to the tangential direction T of the disk D and one dividing line which is parallel to the radial direction R thereof.

The direction of grating is parallel to the tangential direction T of the disk D in all the regions 10 to 17. The pattern of grating is linear, equally apart from each other, in all of the regions 10 to 17. The distance between lines is the smallest in the regions 10 and 17. The distance between lines is larger in the regions 11 and 16 and is yet larger in the regions 12 and 15. The distance between lines is the largest in the regions 13 and 14.

A cross section of the grating has a saw-tooth appearance in all of the regions 10 to 17. When a phase difference between the peak and the valley of the saw teeth is 2π, almost 100% of the incident light (reflected light from the disk D) to each region is diffracted as the plus first order diffracted beam. The saw teeth in the regions 10 to 13 are so oriented that the plus first order diffracted beam is directed towards the left in the figure. The saw teeth in the regions 14 to 17 are so oriented that the plus first order diffracted beam is directed towards the right in the figure.

As shown in FIG. 2, the region 10 of the above-mentioned holographic optical element 7 is supplied with the light component of the reflected light from the disk D on one side (the upper segments in FIG. 2) in the tangential direction T and on one side (the leftmost segment in FIG. 2) in the radial direction R of the disk D. The region 11 is supplied with the light component of the reflected light from the disk D on one side in the tangential direction T and on the left half of the intermediate portion in the radial direction R of the disk D. The region 12 is supplied with the light component of the reflected light from the disk D on one side in the tangential direction T and on the right half of the intermediate portion in the radial direction R of the disk D. The region 13 is supplied with the light component of the reflected light from the disk D on one side in the tangential direction T and on the other side (the rightmost segment in FIG. 2) in the radial direction R of the disk D.

In addition, the region 14 of the holographic optical element 7 is supplied with the light component of the reflected light from the disk D on the other side (the lower segments in FIG. 2) in the tangential direction T and on one side in the radial direction R of the disk D. The region 15 is supplied with the light component of the reflected light from the disk D on the other side in the tangential direction T and on the left half of the intermediate portion in the radial direction R of the disk D. The region 16 is supplied with the light component of the reflected light from the disk D on the other side in the tangential direction T and on the right half of the intermediate portion in the radial direction R of the disk D. The region 17 is supplied with the light component of the reflected light from the disk D on the other side in the tangential direction T and on the other side in the radial direction R of the disk D.

Figure 3:
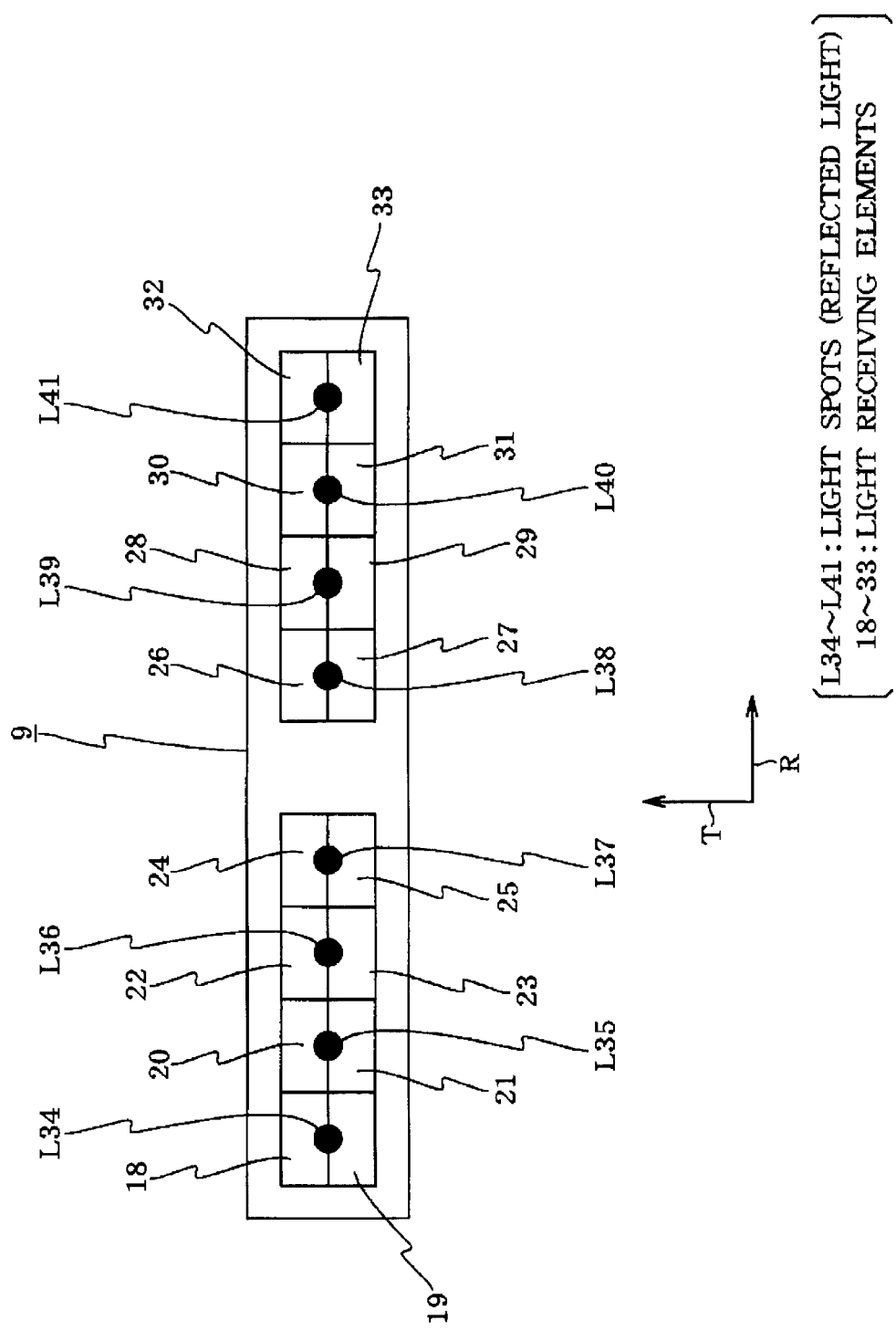
FIG. 3 is a front view showing location of light spots on a photodetector illustrated in FIG. 1 and light receiving elements thereof.

Next, the above-mentioned photodetector 9 will be described in detail. FIG. 3 shows a pattern of the light receiving elements of the photodetector 9 and location of light spots on the photodetector 9.

The photodetector 9 comprises sixteen light receiving elements 18 to 33. The first set of the light receiving elements 18 to 25 and the second set of the light receiving elements 26 to 33 are each formed by dividing, into eight segments, a rectangular photoreceiving surface by a single dividing line which is in parallel with the radial direction R of the disk D and three dividing lines which are perpendicular thereto and are in parallel with the tangential direction T of the disk D.

In this event, a light spot L34 corresponds to the plus first order diffracted beam from the region 10 of the holographic optical element 7 and is focused on the boundary between the light receiving elements 18 and 19, in which the boundary is in parallel to the radial direction R. A light spot L35 corresponds to the plus first order diffracted beam from the region 11 of the holographic optical element 7 and is focused on the boundary between the light receiving elements 20 and 21, in which the boundary is in parallel to the radial direction R.

A light spot L36 corresponds to the plus first order diffracted beam from the region 12 of the holographic optical element 7 and is focused on the boundary between the light receiving elements 22 and 23, in which the boundary is in parallel to the radial direction R. A light spot L37 corresponds to the plus first order diffracted beam from the region 13 of the holographic optical element 7 and is focused on the boundary between the light receiving elements 24 and 25, in which the boundary is in parallel to the radial direction R.

A light spot L38 corresponds to the plus first order diffracted beam from the region 14 of the holographic optical element 7 and is focused on the boundary between the light receiving elements 26 and 27, in which the boundary is in parallel to the radial direction R. A light spot L39 corresponds to the plus first order diffracted beam from the region 15 of the holographic optical element 7 and is focused on the boundary between the light receiving elements 28 and 29, in which the boundary is in parallel to the radial direction R.

A light spot L40 corresponds to the plus first order diffracted beam from the region 16 of the holographic optical element 7 and is focused on the boundary between the light receiving elements 30 and 31, in which the boundary is in parallel to the radial direction R. A light spot L41 corresponds to the plus first order diffracted beam from the region 17 of the holographic optical element 7 and is focused on the boundary between the light receiving elements 32 and 33, in which the boundary is in parallel to the radial direction R.

More specifically, the light receiving elements 18 and 19 receive the light components of the reflected light from the disk D on one side in the tangential direction T and on one side in the radial direction R of the disk D. The light receiving elements 20 and 21 receive the light components of the reflected light from the disk D on one side in the tangential direction T and on the left half of the intermediate portion in the radial direction R of the disk D. The light receiving elements 22 and 23 receive the light components of the reflected light from the disk D on one side in the tangential direction T and on the right half of the intermediate portion in the radial direction R of the disk D. The light receiving elements 24 and 25 receive the light components of the reflected light from the disk D on one side in the tangential direction T and on the other side in the radial direction R of the disk D.

Moreover, the light receiving elements 26 and 27 receive the light components of the reflected light from the disk D on the other side in the tangential direction T and on one side in the radial direction R of the disk D. The light receiving elements 28 and 29 receive the light components of the reflected light from the disk D on the other side in the tangential direction T and on the left half of the intermediate portion in the radial direction R of the disk D. The light receiving elements 30 and 31 receive the light components of the reflected light from the disk D on the other side in the tangential direction T and on the right half of the intermediate portion in the radial direction R of the disk D. The light receiving elements 32 and 33 receive the light components of the reflected light from the disk D on the other side in the tangential direction T and on the other side in the radial direction R of the disk D.

Next, the signal processing circuit 42 will be described. Each of the above-mentioned light receiving elements 18 to 33 produces an electrical current which is in proportion to the intensity of the light received. The outputs from the light receiving elements 18 to 33 are represented as V18 to V33, respectively. The signal processing circuit 42 calculates a focus error signal using the Foucault method, from the following arithmetic operation:

(V18+V20+V22+V24+V27+V29+V31+V33)−(V19+V21+V23+V25+V26+V28+V30+V32).

The calculation result is supplied to the driving circuit 43. The signal processing circuit 42 also calculates a tracking error signal using the push-pull method, from the following arithmetic operation:

(V18+V19+V20+V21+V26+V27+V28+V29)−(V22+V23+V24+V25+V30+V31+V32+V33).

The calculation result is supplied to the driving circuit 43. Furthermore, the signal processing circuit 42 calculates a playback signal from the following arithmetic operation:

V18+V19+V20+V21+V22+V23+V24+V25+V26+V27+V28+V29+V30+V31+V32+V33.

The calculation result is supplied to, for example, a host system to which the optical information recording/reproducing device 1 is connected.

The signal processing circuit 42 also comprises a tilt signal generating unit 212 that generates, from the output of the photodetector 9, a tangential tilt signal indicative of an amount of tilt of the disk D in the tangential direction T with respect to the objective lens 5. In this event, the tilt signal generating unit 212 calculates the tangential tilt signal from the following arithmetic operation:

(V18+V19+V24+V25+V28+V29+V30+V31)−(V20+V21+V22+V23+V26+V27+V32+V33).

The calculation result is supplied to the driving circuit 43.

Figure 4:
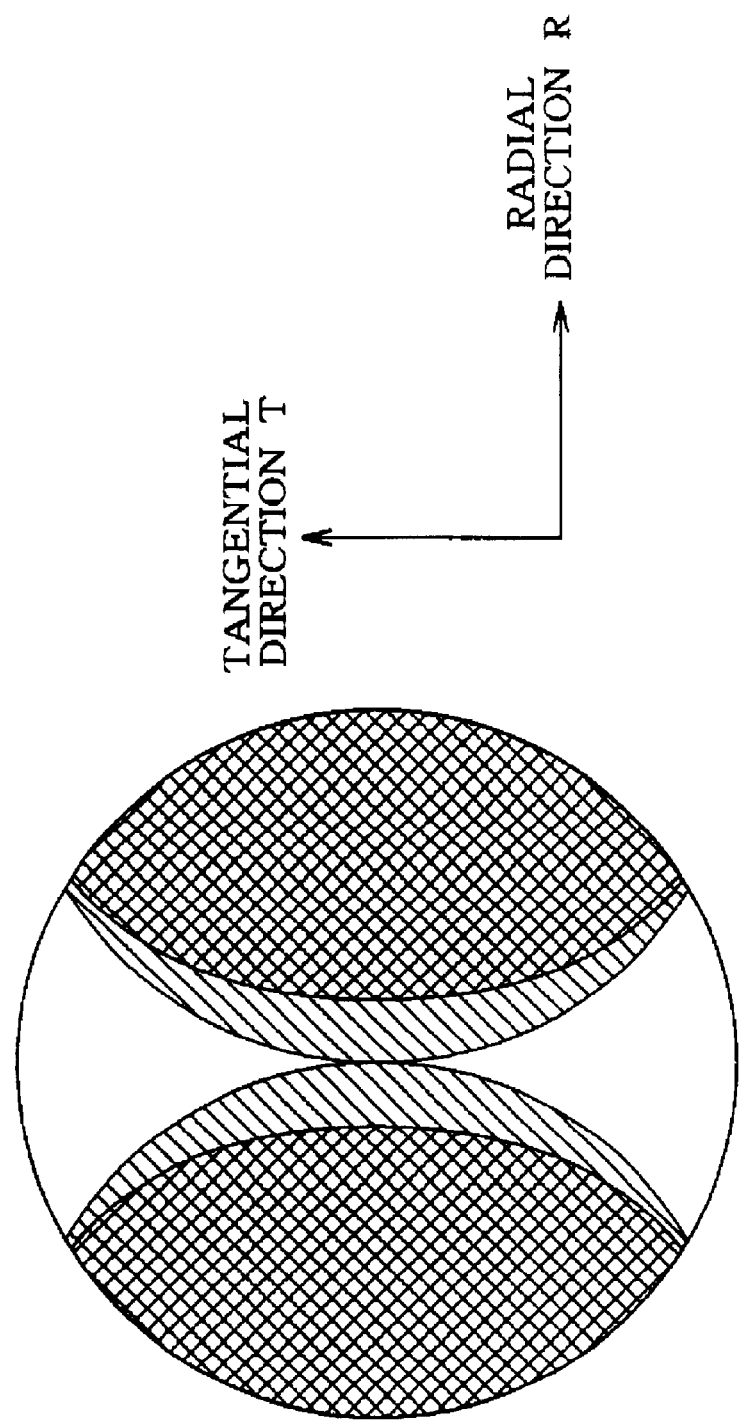
FIG. 4 is a view for use in describing an example of calculation for intensity distribution of reflected light from a disk in an optical head assembly illustrated in FIG. 1, in which there is no tangential tilt of the disk and the focused light spots are located on grooves or lands in or on the disk.
Figure 5:
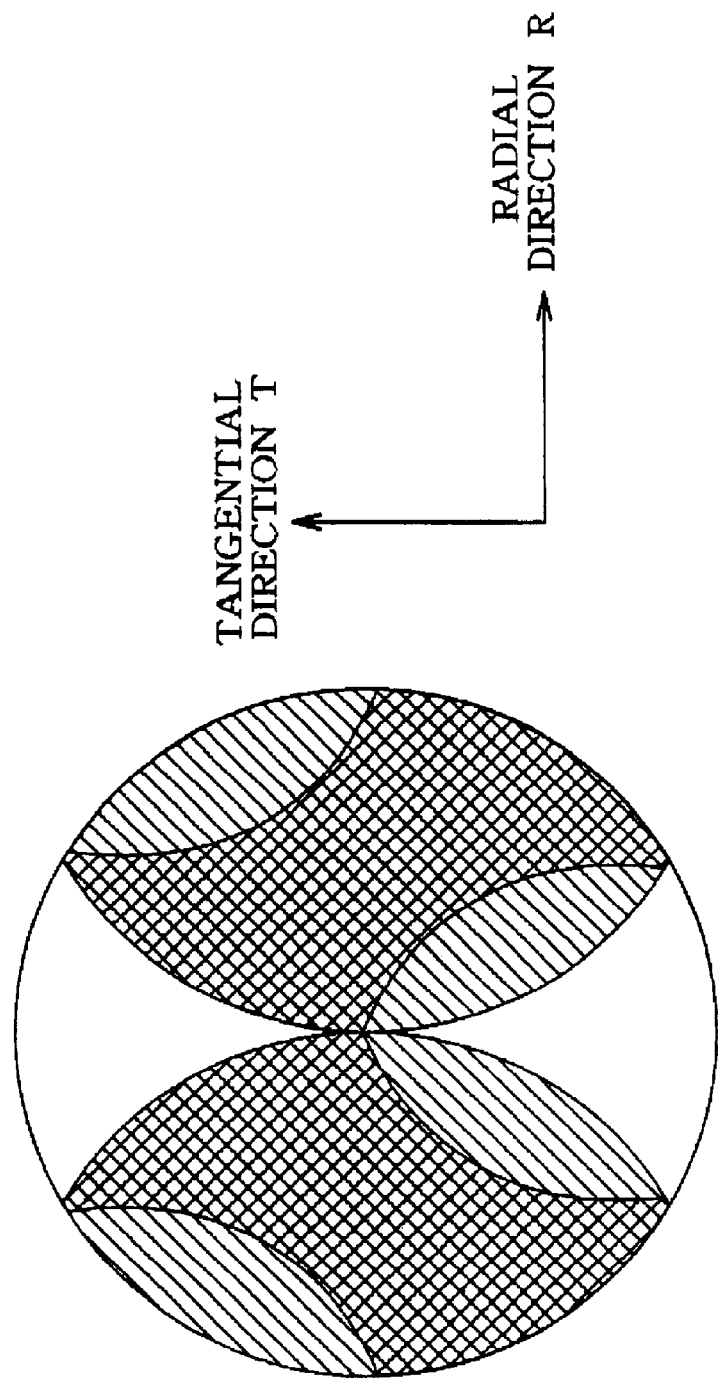
FIG. 5 is a view for use in describing an example of calculation for intensity distribution of reflected light from a disk in optical head assembly illustrated in FIG. 1, in which there is a tangential tilt of +0.2 degrees (−0.2 degrees) of the disk and the focused light spots are located on grooves in (lands on) the disk D.
Figure 6:
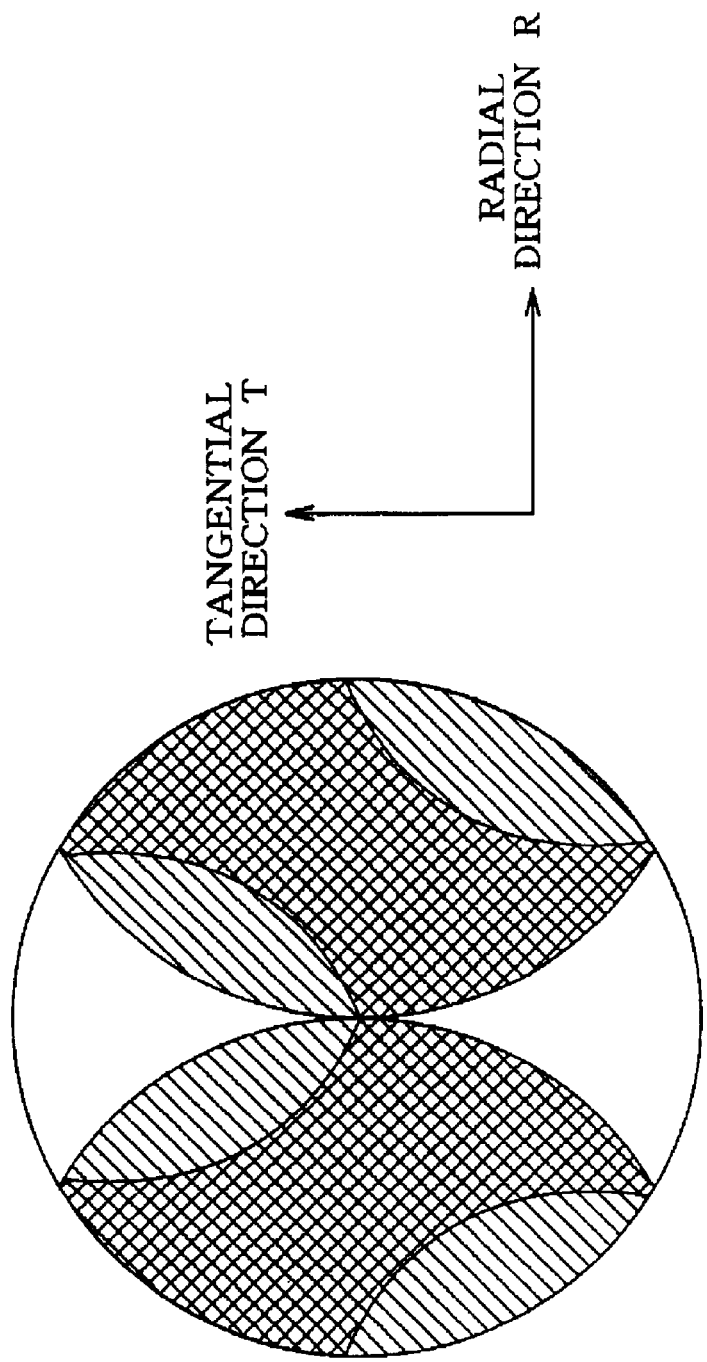
FIG. 6 is a view for use in describing an example of calculation for intensity distribution of reflected light from a disk in optical head assembly illustrated in FIG. 1, in which there is a tangential tilt of −0.2 degrees (+0.2 degrees) on the disk and the focused light spots are located on grooves in (lands on) the disk D.

Referring to FIGS. 4 to 7, a method for detecting the tangential tilt of the disk D will be described. FIGS. 4 to 6 show examples of calculation for the intensity distribution of the reflected light from the disk D. The calculation is made for the condition where the wavelength of the semiconductor laser 6 is 660 nm, the numerical aperture of the objective lens 5 is 0.65, the thickness of the substrate of the disk D is 0.6 mm, the track pitch is 0.5 $\mu$m, and the depth of the groove is 70 nm. The cross-hatched area and the diagonally-hatched area in the figure represent the high-intensity region and the low-intensity region, respectively.

FIG. 4 shows the intensity distribution obtained when there is no tangential tilt of the disk D and the focused light spots are located on grooves or lands in or on the disk D. The intensity distribution is symmetrical with respect to the line traversing the optical axis and parallel to the radial direction R of the disk D and to the line traversing the optical axis and parallel to the tangential direction T of the disk D. The intensity is relatively high in the left-side portion of the region where the zero order beam from the disk D is overlapped with the plus first order diffracted beam (i.e., the left-side one of the two cross-hatched areas) therefrom, and in the right-side portion of the region where the zero order beam from the disk D is overlapped with the minus first order diffracted beam (i.e., the right-side one of the two cross-hatched areas) therefrom. The intensity is relatively low in the portion, closer to the center, of the region where the zero order beam from the disk D is overlapped with the plus first order diffracted beam therefrom, and in the portion, closer to the center, of the region where the zero order beam from the disk D is overlapped with the minus first order diffracted beam therefrom.

FIG. 5 shows the intensity distribution obtained when there is a tangential tilt of +0.2 degrees of the disk D and the focused light spots are located on the grooves in the disk D or when there is a tangential tilt of −0.2 degrees of the disk D and the focused light spots are located on the lands on the disk D. When the tangential tilt has a positive value (positive tangential tilt), the disk D is tilted around the axis in the radial direction R such that it is closer to the objective lens 5 in the upper portion of the reflected light in FIG. 4 and the disk D is away from the objective lens 5 in the lower portion thereof. When the tangential tilt has a negative value (negative tangential tilt), the disk D is tilted around the axis in the radial direction R such that it is closer to the objective lens 5 in the lower portion of the reflected light in FIG. 4 and the disk D is away from the objective lens 5 in the upper portion thereof.

The intensity distribution in FIG. 5 is symmetrical with respect to the line traversing the optical axis and parallel to the tangential direction T of the disk D. The intensity in the front-side portion (the upper side in the figure) in the tangential direction T of the disk D is lower than that illustrated in FIG. 4, in the left-side portion of the region where the zero order beam from the disk D is overlapped with the plus first order diffracted beam therefrom, and in the right-side portion of the region where the zero order beam from the disk D is overlapped with the minus first order diffracted beam therefrom.

The intensity in the same front-side portion is higher than that illustrated in FIG. 4, in the portion, closer to the center, of the region where the zero order beam from the disk D is overlapped with the plus first order diffracted beam therefrom, and in the portion, closer to the center, of the region where the zero order beam from the disk D is overlapped with the minus first order diffracted beam therefrom.

The intensity in the rear-side portion (the lower side in the figure) in the tangential direction T of the disk D is higher than that illustrated in FIG. 4, in the left-side portion of the region where the zero order beam from the disk D is overlapped with the plus first order diffracted beam therefrom, and in the right-side portion of the region where the zero order beam from the disk D is overlapped with the minus first order diffracted beam therefrom.

The intensity in the same rear-side portion is lower than that illustrated in FIG. 4, in the portion, closer to the center, of the region where the zero order beam from the disk D is overlapped with the plus first order diffracted beam therefrom, and in the portion, closer to the center, of the region where the zero order beam from the disk D is overlapped with the minus first order diffracted beam therefrom.

FIG. 6 shows the intensity distribution obtained when there is a tangential tilt of −0.2 degrees of the disk D and the focused light spots are located on the grooves in the disk D or when there is a tangential tilt of +0.2 degrees of the disk D and the focused light spots are located on the lands on the disk D.

The intensity distribution in FIG. 6 is symmetrical with respect to the line traversing the optical axis and parallel to the tangential direction T of the disk D. The intensity in the front-side portion (the upper side in the figure) in the tangential direction T of the disk D is higher than that illustrated in FIG. 4, in the left-side portion of the region where the zero order beam from the disk D is overlapped with the plus first order diffracted beam therefrom, and in the right-side portion of the region where the zero order beam from the disk D is overlapped with the minus first order diffracted beam therefrom.

The intensity in the same front-side portion is lower than that illustrated in FIG. 4, in the portion, closer to the center, of the region where the zero order beam from the disk D is overlapped with the plus first order diffracted beam therefrom, and in the portion, closer to the center, of the region where the zero order beam from the disk D is overlapped with the minus first order diffracted beam therefrom.

The intensity in the rear-side portion (the lower side in the figure) in the tangential direction T of the disk D is lower than that illustrated in FIG. 4, in the left-side portion of the region where the zero order beam from the disk D is overlapped with the plus first order diffracted beam therefrom, and in the right-side portion of the region where the zero order beam from the disk D is overlapped with the minus first order diffracted beam therefrom.

The intensity in the same rear-side portion is higher than that illustrated in FIG. 4, in the portion, closer to the center, of the region where the zero order beam from the disk D is overlapped with the plus first order diffracted beam therefrom, and in the portion, closer to the center, of the region where the zero order beam from the disk D is overlapped with the minus first order diffracted beam therefrom.

Figure 7:
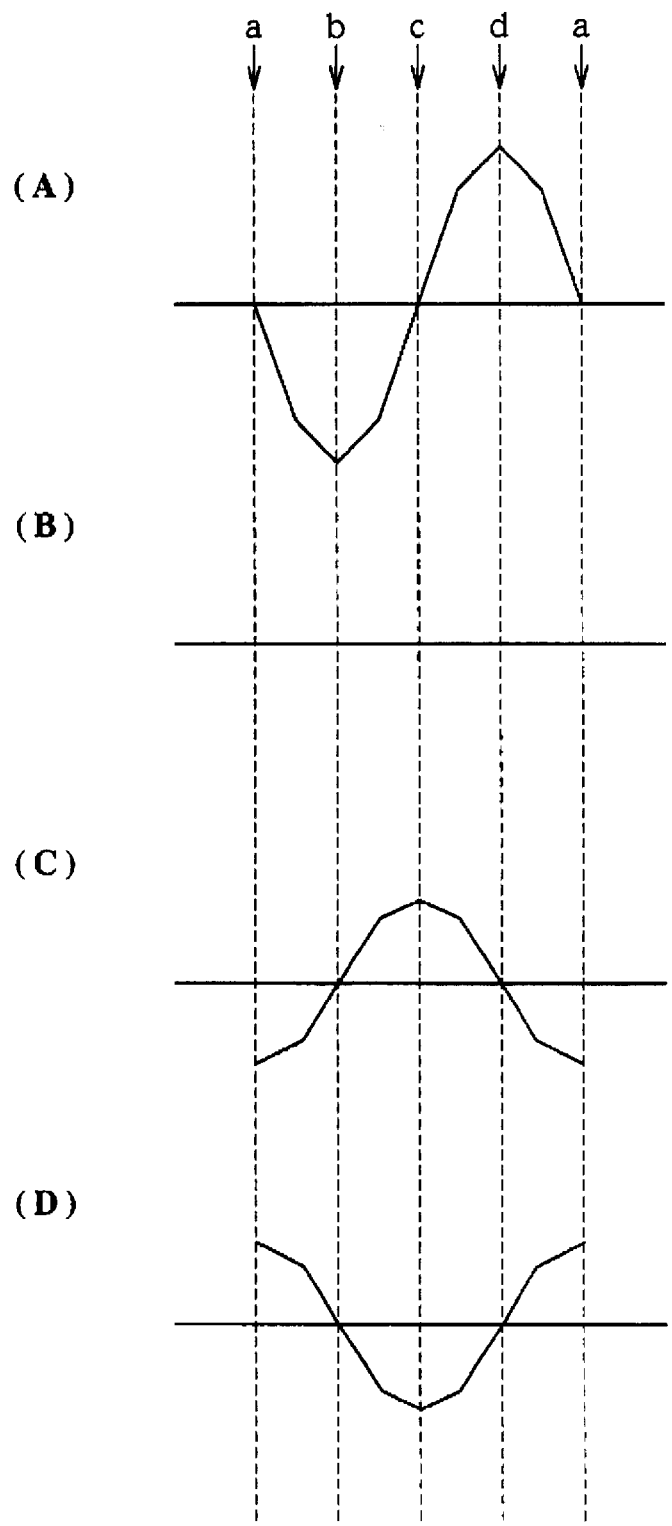
FIG. 7A is a graphical representation of a tracking error signal generated by a signal processing circuit.
FIG. 7B is a graphical representation of a tangential tilt signal obtained when there is no tangential tilt.
FIG. 7C is a graphical representation of a tangential tilt signal obtained when there is a positive tangential tilt.
FIG. 7D is a graphical representation of a tangential tilt signal obtained when there is a negative tangential tilt.

FIG. 7 shows some waveforms associated with a tracking error signal and a tangential tilt signal. The horizontal represents a positional shifting of the focused light spots and the grooves caused during the transversal movement of the focused light sports on the grooves in the disk D from left to right in the radial direction R. Reference character "a" is for the state where the focused light spots are located on the groove. Reference character "b" is for the state where the focused light spots are located on the boundary between the groove and the land. Reference character "c" is for the state where the focused light spots are located on the land. Reference character "d" is for the state where the focused light spots are located on the boundary between the land and the groove.

In FIGS. 4 to 6, the light components directed to the front-side portion in the tangential direction T of the disk D and to the left-side portion of the region where the zero order beam from the disk D is overlapped with the plus first order diffracted beam therefrom, are received by the light receiving elements 18 and 19 of the photodetector 9. The light components directed to the portion, closer to the center, of the same region are received by the light receiving elements 20 and 21 of the photodetector 9.

The light components directed to the front-side portion in the tangential direction T of the disk D and to the portion, closer to the center, of the region where the zero order beam from the disk D is overlapped with the minus first order diffracted beam therefrom, are received by the light receiving elements 22 and 23 of the photodetector 9. The light components directed to the right-side portion of the same region are received by the light receiving elements 24 and 25 of the photodetector 9.

Moreover, the light components directed to the rear-side portion in the tangential direction T of the disk D and to the left-side portion of the region where the zero order beam from the disk D is overlapped with the plus first order diffracted beam therefrom, are received by the light receiving elements 26 and 27 of the photodetector 9. The light components directed to the portion, closer to the center, of the same region are received by the light receiving elements 28 and 29 of the photodetector 9.

The light components directed to the rear-side portion in the tangential direction T of the disk D and to the portion, closer to the center, of the region where the zero order beam from the disk D is overlapped with the minus first order diffracted beam therefrom, are received by the light receiving elements 30 and 31 of the photodetector 9. The light components directed to the right-side portion of the same region are received by the light receiving elements 32 and 33 of the photodetector 9.

In this event, the tracking error signal, (V18+V19+V20+V21+V26+V27+V28+V29) (V22+V23+V24+V25+V30+V31+V32+V33), has a waveform as indicated in FIG. 7A.

When there is no tangential tilt of the disk D, the tangential tilt signal, (V18+V19+V24+V25+V28+V29+V30+V31)−(V20+V21+V22+V23+V26+V27+V32+V33), has a value of zero both when the focused light spots are located on the groove in the disk D or when they are on the land on the disk D. Therefore, the waveform thereof is as indicated in FIG. 7B.

When there is a positive tangential tilt of the disk D, the tangential tilt signal, (V18+V19+V24+V25+V28+V29+V30+V31)−(V20+V21+V22+V23+V26+V27+V32+V33), has a negative value when the focused light spots are located on the groove in the disk D and has a positive value when they are on the land. Therefore, the waveform thereof is as indicated in FIG. 7C.

When there is a negative tangential tilt of the disk D, the tangential tilt signal, (V18+V19+V24+V25+V28+V29+V30+V31)−(V20+V21+V22+V23+V26+V27+V32+V33), has a positive value when the focused light spots are located on the groove in the disk D and has a negative value when they are on the land. Therefore, the waveform thereof is as indicated in FIG. 7D.

First, it is contemplated that tracking servo control is performed for the state "a", that is, the grooves, by using the tracking error signal shown in FIG. 7A. When the tangential tilt of the disk D has a value of zero, a positive value, and a negative value, the values of the tangential tilt signal shown in FIGS. 7B to 7D are zero, a negative value, and a positive value, respectively. Thus, the tangential tilt of the disk D can be detected by using this tangential tilt signal.

Next, it is contemplated that tracking servo control is performed for the state "c", that is, the lands, by using the tracking error signal shown in FIG. 7A. When the tangential tilt of the disk D has a value of zero, a positive value, and a negative value, the values of the tangential tilt signal shown in FIGS. 7B to 7D are zero, a positive value, and a negative value, respectively. Thus, the tangential tilt of the disk D can be detected by using this tangential tilt signal.

Figure 8:
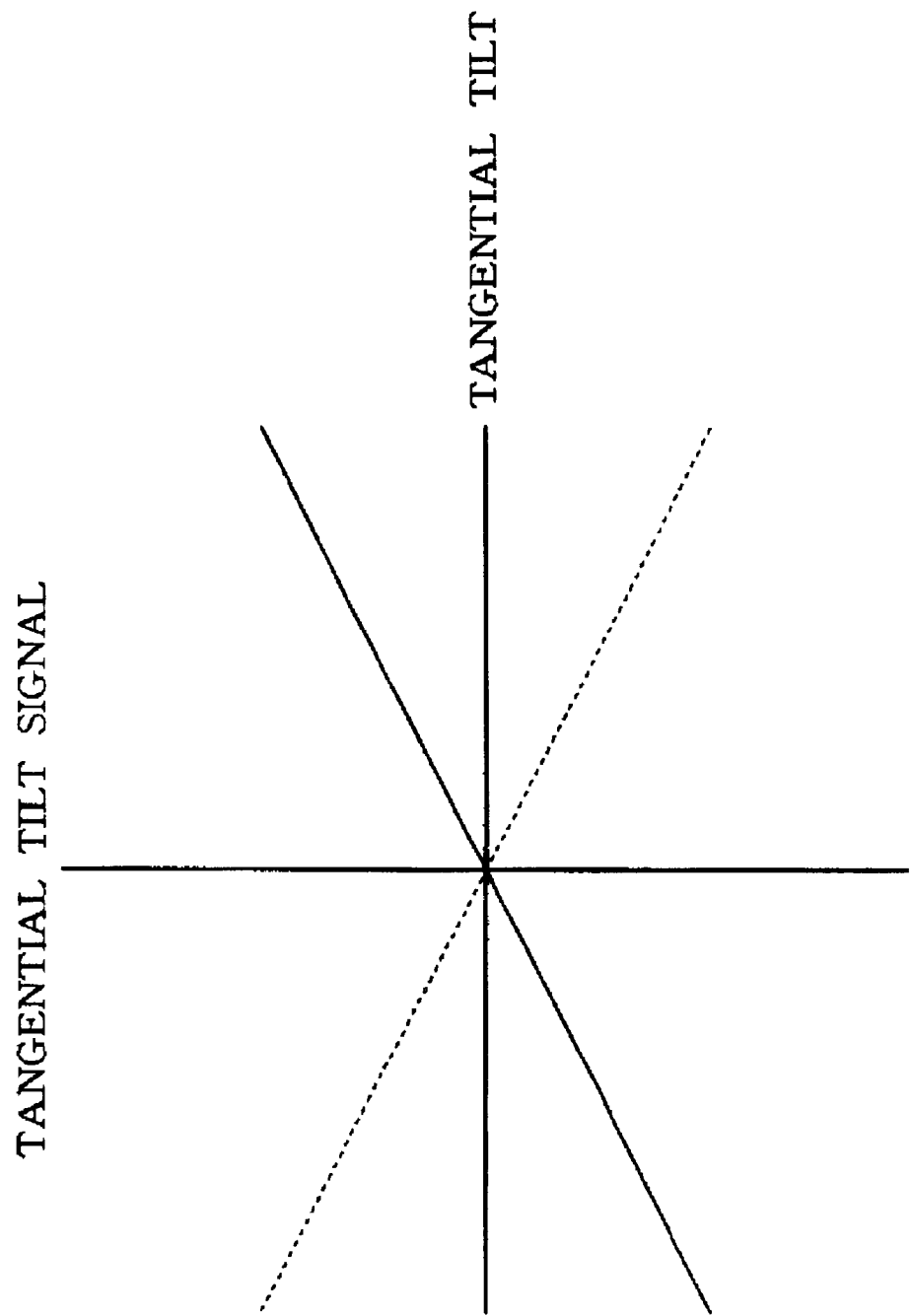
FIG. 8 is a diagram showing characteristics of the tangential tilt signal of an optical head assembly illustrated in FIG. 1.

FIG. 8 shows tangential tilt signal characteristics obtained during the tracking servo control. The horizontal represents the tangential tilt and the vertical represents the tangential tilt signal normalized by a sum signal. The characteristic denoted by a dotted line in the figure is for the case where the tracking servo control is performed for the grooves. The characteristic denoted by a solid line is for the case where the tracking servo control is performed for the lands. When the tracking servo control is performed for both the grooves and lands, the larger the absolute value of the tangential tilt is, the larger the absolute value of the tangential tilt signal is.

Sensitivity of the tangential tilt detection is given by the absolute value of the slopes of the solid and dotted lines in the figure. The absolute value is about 0.47/degree under the conditions where the intensity distributions shown in FIGS. 4 to 6 are calculated, which is significantly high for the sensitivity. As apparent from the above, the tangential tilt can be detected at a high sensitivity by means of detecting the tangential tilt of the disk D according to the change in intensity of the light components reflected from the disk D because the change in intensity of the light components reflected from the disk D is significant with respect to the tangential tilt.

The tangential tilt signal is not limited to the signal obtained from the arithmetic operation of (V18+V19+V24+V25+V28+V29+V30+V31)−(V20+V21+V22+V23+V26+V27+V32+V33). Instead, the tangential tilt signal may be any signals that have different values for the tangential tilts of the disk D of zero, a positive value, and a negative value.

For example, a signal obtained from the following arithmetic operations may be used as the tangential tilt signal:

(V18+V19+V24+V25)−(V20+V21+V22+V23);

(V28+V29+V30+V31)−(V26+V27+V32+V33);

V18+V19+V24+V25+V28+V29+V30+V31;

V20+V21+V22+V23+V26+V27+V32+V33;

V18+V19+V24+V25;

V20+V21+V22+V23;

V26+V27+V32+V33; and

V28+V29+V30+V31.

In this event, it is preferable that the tilt signal generating unit 212 in particular is provided with a zero point correction unit for use in adjusting tangential tilt signal outputs by external operations and an electrical offset is added to the tangential tilt signal so that the tangential tilt signal has a value of zero when the tangential tilt of the disk D is zero.

Next, the driving circuit 43 for the objective lens driving unit 211 will be described. The objective lens driving unit 211 comprises an actuator. It serves to shift the objective lens 5 in response to the above-mentioned focus and tracking error signals and also serves as a tilt correction unit for use in adjusting any tilt of the disk D in the tangential direction T (the tilt caused by rotation about the axis along the radial direction R) with respect to the objective lens 5 in question. Specific configurations of actuators are described in, for example, Technical Digest of ISOM/ODS 99, pages 20–22.

On the other hand, the driving circuit 43 controls operation of the objective lens driving unit 211 so that the tangential tilt signal from the signal processing circuit 42 has a value of zero. This allows correction of the tangential tilt of the disk D, eliminating any adverse effects on recording/reproduction characteristics.

In addition, as shown in FIG. 8 mentioned above, the sign (+or −) of the tangential tilt signal is reversed between the tracking servo control performed for the grooves and that for the lands. Therefore, it is necessary to change polarity of the driving circuit 43 for between the grooves and the lands in order to properly correct the tangential tilt.

With this respect, the signal processing circuit 42 has a land/groove switching function to determine, in response to the above-mentioned tracking error signal, whether the focused light spots on the disk D are located on the lands or on the grooves and to switch, based on the determination result, the polarity of the driving circuit 43.

Figure 9:
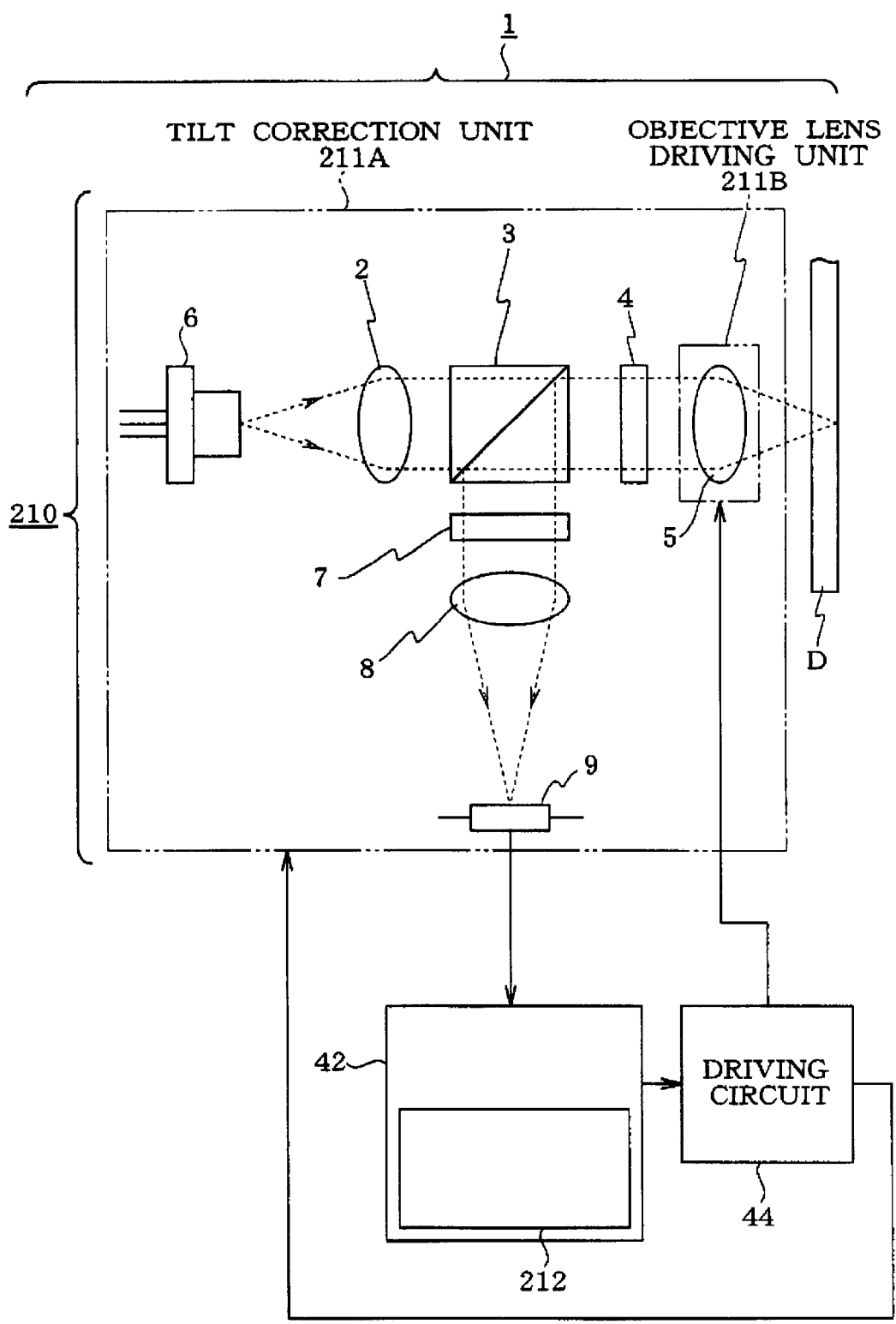
FIG. 9 is a block diagram showing an example of another tilt correction unit.

FIG. 9 shows another example of the tilt correction unit. While the tilt correction unit has thus been described as the objective lens driving unit 211 that holds the objective lens 5 in the optical information recording/reproducing device 1, the present invention is not specifically limited to such a configuration. For example, as shown in FIG. 9, a tilt correction unit 211A may be used that holds the entire structure, other than the signal processing unit 42, of the optical head assembly 210 and tilts it in the tangential direction T (the direction of rotation about the axis along the radial direction R) of the disk D to correct the tilt of the disk D.

With such a configuration, a driving circuit 44 controls operation of the tilt correction unit 211A, which tilts the whole optical head assembly 210 in the tangential direction T of the disk D by means of a motor (not shown) so that the tangential tilt signal supplied from the signal processing circuit 42 has a value of zero. This corrects the tangential tilt of the disk D, eliminating any adverse effects on recording/reproduction characteristics. Specific configurations of the tilt correction unit are described in, for example, the above-mentioned Japanese Patent Laid-Open No. 9-161293. The driving circuit 44 also controls operation of the objective lens driving unit 211B to carry out focusing and tracking.

Moreover, another configuration of the tilt correction unit may be contemplated that corrects the tangential tilt of the disk D with a liquid crystal optical element disposed in the optical system of the optical head assembly 210. With this configuration, a coma aberration is produced to compensate for, by applying a voltage to the liquid crystal optical element, the coma aberration for which the substrate of the disk D is responsible so that the tangential tilt signal has a value of zero. Specific configurations of liquid crystal optical elements are described in, for example, Technical Digest of ISOM/ODS 99, pages 351–353.

(Second Embodiment)

A second embodiment of the present invention will be described with reference to FIGS. 10 and 11. Similar components and parts shown in this embodiment to those of the above-mentioned optical information recording/reproducing device 1 are depicted by the same reference numerals and characters, and of which detailed description will be omitted.

Figure 10:
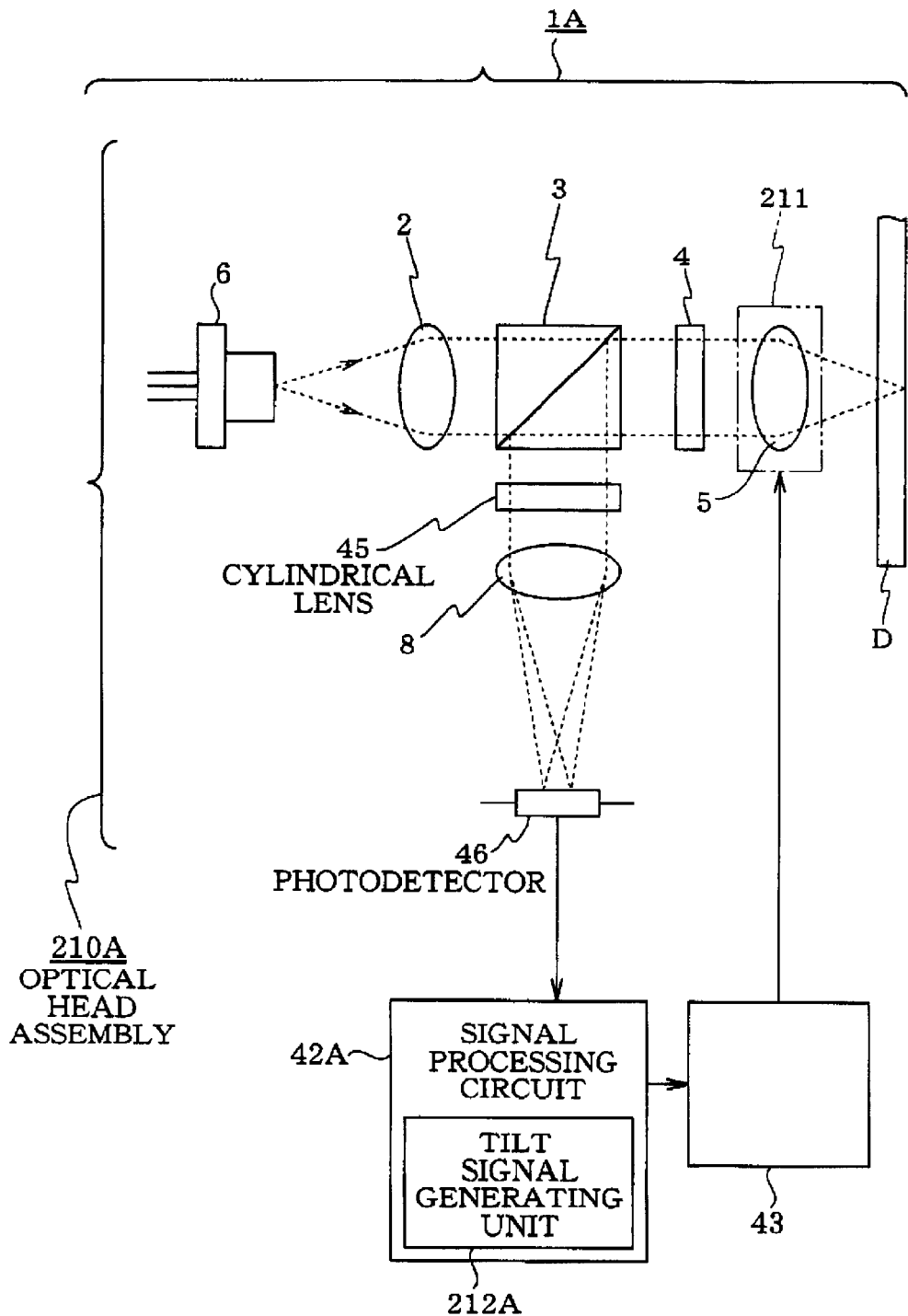
FIG. 10 is a block diagram showing a second embodiment of the present invention.

FIG. 10 shows a block diagram of an optical information recording/reproducing device 1A according to the second embodiment. The optical information recording/reproducing device 1A is similar to the optical information recording/reproducing device 1 except that it comprises a cylindrical lens 45 disposed at the same position as the above-mentioned holographic optical element 7 in place thereof, a photodetector 46 with less light receiving elements disposed at the same position as the photodetector 9 in place thereof, and a signal processing circuit 42A, in place of the signal processing circuit 42, which is adapted to generate various signals in response to outputs from the photodetector 46.

The photodetector 46 is located on the midway of the line focuses of the above-mentioned cylindrical lens 45 and the lens 8.

Figure 11:
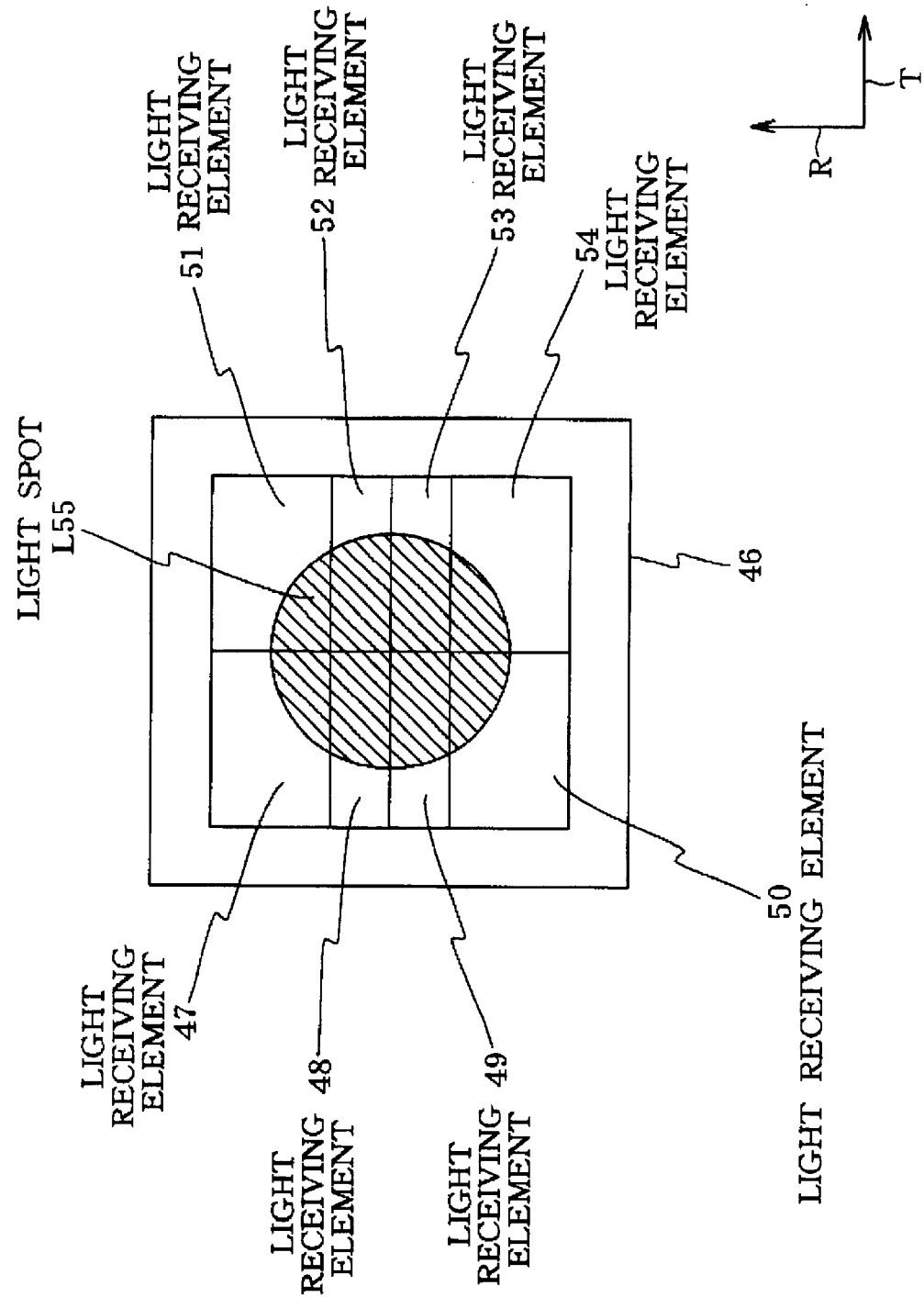
FIG. 11 is a front view showing location of a light spot on a photodetector illustrated in FIG. 10 and light receiving elements thereof.

FIG. 11 shows a pattern of the light receiving elements of the photodetector 46 and location of a light spot on the photodetector 46. The photodetector 46 comprises light receiving elements 47 to 54 formed by dividing, into eight segments, a photoreceiving surface to receive a light spot L55 which is reflected from the disk D by three dividing lines which are in parallel with the tangential direction T of the disk D, and a single dividing line which is perpendicular thereto and is in parallel with the radial direction R of the disk D.

The up-and-down direction of the figure corresponds to the tangential direction T for the focused light spot on the disk D. However, the up-and-down direction of the figure corresponds to the radial direction R for the light spot L55 on the photodetector 46 due to an effect of the cylindrical lens 45 and the lens 8. Accordingly, the light receiving element 51 receives the light component of the reflected light from the disk D on one side in the tangential direction T and on one side in the radial direction R of the disk D. The light receiving element 52 receives the light component of the reflected light from the disk D on one side in the tangential direction T and on a half of the intermediate portion in the radial direction R of the disk D. The light receiving element 53 receives the light component of the reflected light from the disk D on one side in the tangential direction T and on another half of the intermediate portion in the radial direction R of the disk D. The light receiving element 54 receives the light component of the reflected light from the disk D on one side in the tangential direction T and on the other side in the radial direction R of the disk D.

Moreover, the light receiving element 47 receives the light component of the reflected light from the disk D on the other side in the tangential direction T and on one side in the radial direction R of the disk D. The light receiving element 48 receives the light component of the reflected light from the disk D on the other side in the tangential direction T and on a half of the intermediate portion in the radial direction R of the disk D. The light receiving element 49 receives the light component of the reflected light from the disk D on the other side in the tangential direction T and on another half of the intermediate portion in the radial direction R of the disk D. The light receiving element 50 receives the light component of the reflected light from the disk D on the other side in the tangential direction T and on the other side in the radial direction R of the disk D.

Next, the signal processing circuit 42A will be described. Each of the light receiving elements 47 to 54 of the photodetector 46 produces an electrical current depending on the intensity of the light received. The outputs from the light receiving elements 47 to 54 are represented as V47 to V54, respectively. The signal processing circuit 42A calculates a focus error signal using the astigmatic method, from the following arithmetic operation:

$$(V47+V48+V53+V54)-(V49+V50+V51+V52).$$

The calculation result is supplied to the driving circuit 43. The signal processing circuit 42A also calculates a tracking error signal using the push-pull method, from the following arithmetic operation:

$$(V47+V48+V51+V52)-(V49+V50+V53+V54).$$

The calculation result is supplied to the driving circuit 43. Furthermore, the signal processing circuit 42A calculates a playback signal from the following arithmetic operation:

$$V47+V48+V49+V50+V51+V52+V53+V54.$$

The calculation result is supplied to, for example, a host system to which the optical information recording/reproducing device 1A is connected.

The signal processing circuit 42A comprises a tilt signal generating unit 212A that generates a tangential tilt signal. The tilt signal generating unit 212A calculates the tangential tilt signal from the following arithmetic operation:

$$(V47+V50+V52+V53)-(V48+V49+V51+V54).$$

The calculation result is supplied to the driving circuit 43.

In the second embodiment of the optical head assembly according to the present invention, the tangential tilt of the disk D can be detected by using a similar method to the one described in conjunction with FIGS. 4 to 7 in the first embodiment of the optical head assembly according to the present invention.

Therefore, the driving circuit 43 can control operation of the objective lens driving unit 211 in response to the signals supplied from the signal processing circuit 42A to carry out focusing, tracking, and tangential tilt correction.

(Third Embodiment)

Figure 12:
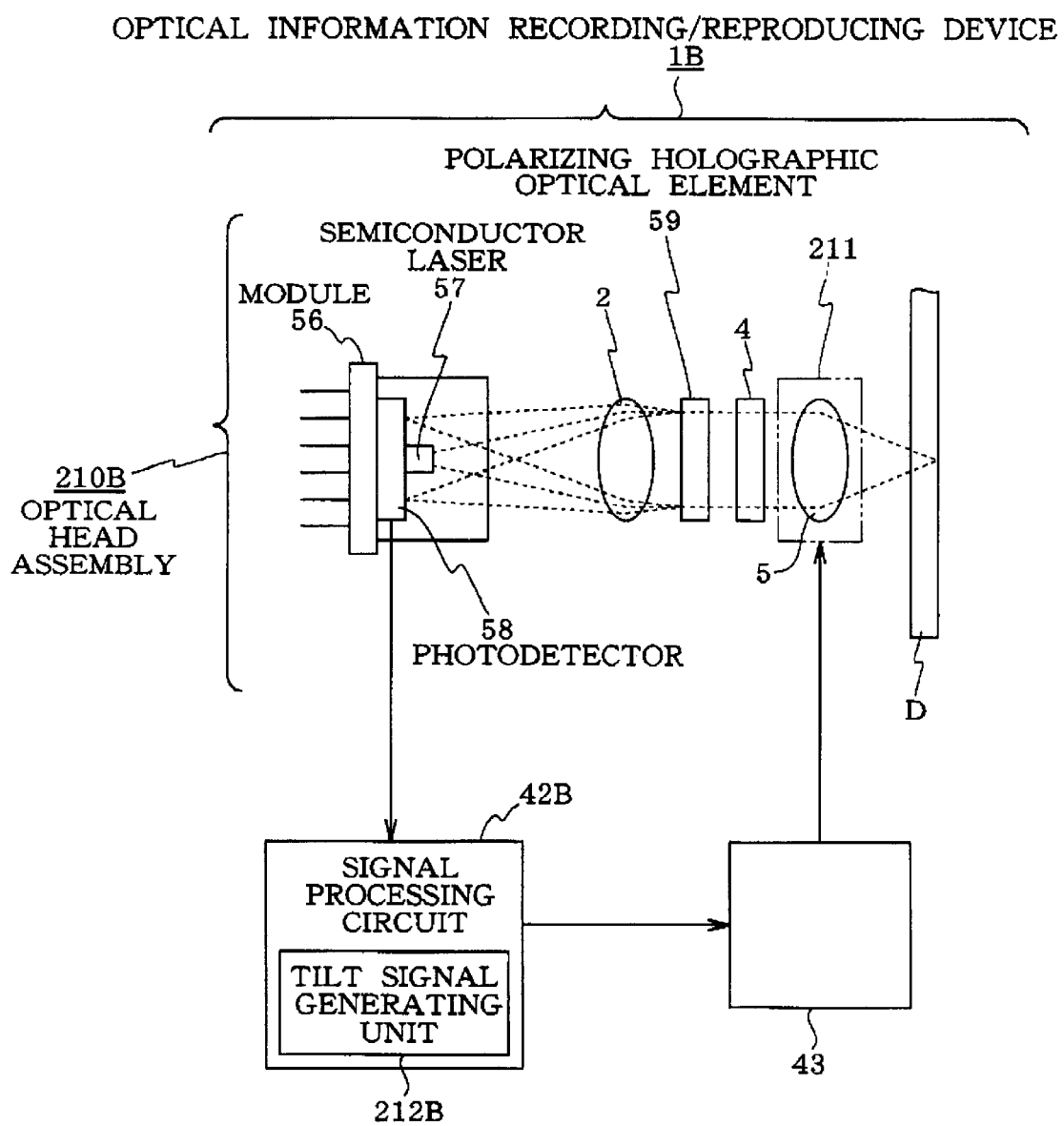
FIG. 12 is a block diagram showing a third embodiment of the present invention.
Figure 13:
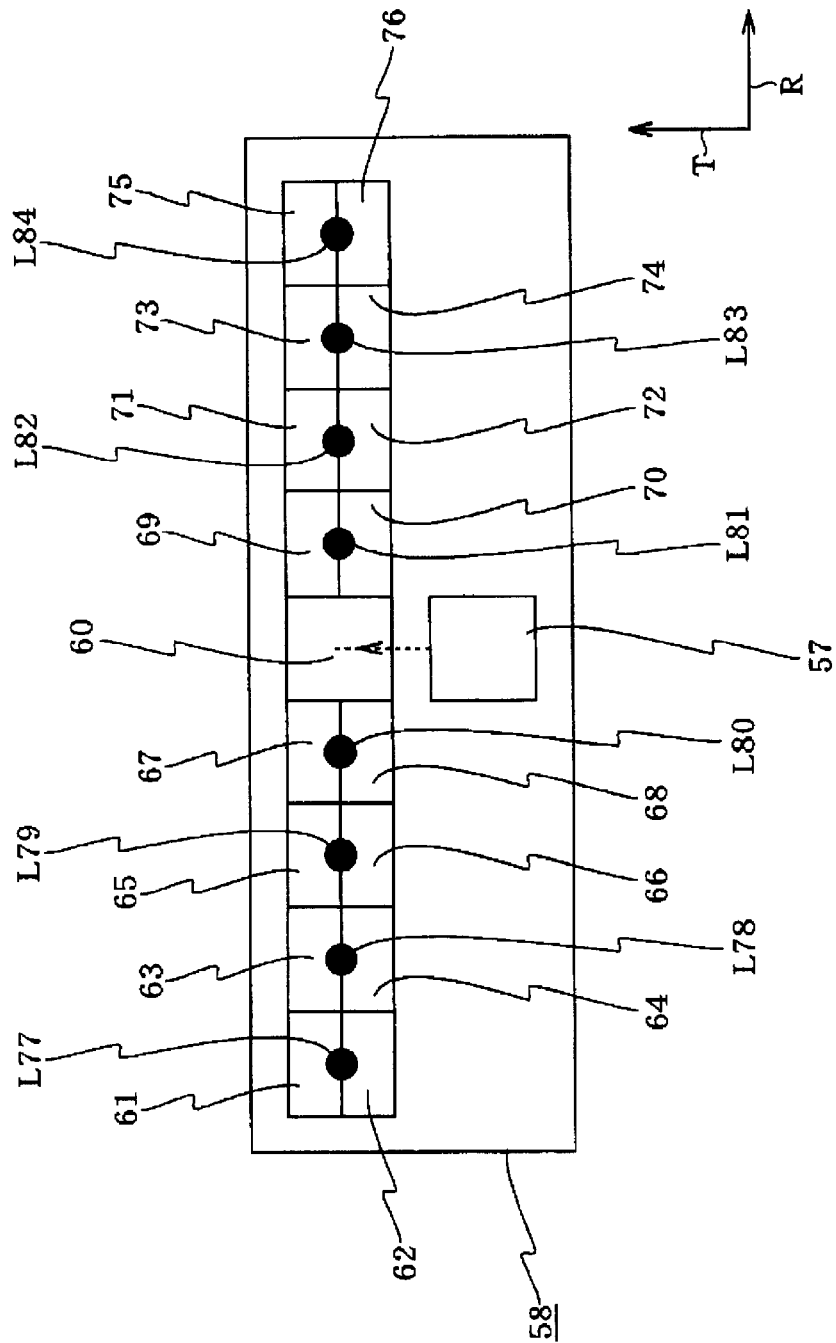
FIG. 13 is a front view showing location of light spots on a photodetector illustrated in FIG. 12 and light receiving elements thereof.

A third embodiment of the present invention will be described with reference to FIGS. 12 and 13. Similar components and parts shown in this embodiment to those of the above-mentioned optical information recording/reproducing device 1 are depicted by the same reference numerals and characters, and of which detailed description will be omitted. FIG. 12 shows a block diagram of an optical information recording/reproducing device 1B according to this embodiment.

The optical information recording/reproducing device 1B comprises an optical head assembly 210B, an objective lens driving unit 211 for focusing, tracking, and tangential tilt correction through the objective lens 5 of the optical head assembly 210B, a driving circuit 43 for the objective lens driving unit 211, and a signal processing circuit 42B adapted to generate various signals, in response to outputs from a photodetector 58 of the optical head assembly 210B.

The optical head assembly 210B comprises a semiconductor laser 57 which serves as a light source to provide a laser beam, a collimator lens 2 for converting the light emitted from the semiconductor laser 57 into parallel rays, and a polarizing holographic optical element 59 that transmits the parallel rays.

The optical head assembly 210B also comprises a quarter-wave plate 4 which creates circular polarization from linear polarization with the transmitted light from the polarizing holographic optical element 59, an objective lens 5 which focuses the transmitted light from the quarter-wave plate 4 onto a disk D, and the photodetector 58 which receives, by predetermined multiple-divided light receiving surfaces, the reflected light from the disk D diffracted by the polarizing holographic optical element 59 in the returning path, to produce signals indicative of light intensities.

The above-mentioned components of the optical head assembly 210B are aligned with each other from the semiconductor laser 57 to the disk D. Therefore, it is not required to use the polarizing beam splitter 3 used in the optical head assembly 210. In addition, the semiconductor laser 57 and the photodetector 58 are placed together in a single module 56.

A plan view of the polarizing holographic optical element 59 is similar to the plan view of the holographic optical element 7 shown in FIG. 2. Accordingly, the following description will be made using the same reference numerals as the regions of the holographic optical element 7. It is noted, however, that the polarizing holographic optical element 59 has a two-layer grating formed of a proton exchange region and a dielectric film on, for example, a lithium niobate substrate with birefringent properties. A cross section of the grating has a two-layer saw-tooth appearance in all of the regions 10 to 17 (see FIG. 2). A phase difference between the peak and the valley of the saw teeth can be defined independently for ordinary rays and extraordinary rays by means of designing the grating with appropriate depth and thickness of the proton exchange region and the dielectric film, respectively. For the outgoing ordinary rays, when the phase difference between the peak and the valley of the saw teeth is zero, almost 100% of the incident light to each region is transmitted. For the returning extraordinary rays, when the phase difference between the peak and the valley of the saw teeth is $2\pi$, almost 100% of the incident light to each region is diffracted as the plus first order diffracted beam.

Next, the above-mentioned photodetector 58 will be described in detail. FIG. 13 shows a pattern of the light receiving elements of the photodetector 58 and location of light spots on the photodetector 58.

The photodetector 58 comprises sixteen light receiving elements 61 to 76. The first set of the light receiving elements 61 to 68 and the second set of the light receiving elements 69 to 76 are each formed by dividing, into eight segments, a rectangular photoreceiving surface by a single dividing line which is in parallel with the radial direction R of the disk D and three dividing lines which are perpendicular thereto and are in parallel with the tangential direction T of the disk D.

In this event, a light spot L77 corresponds to the plus first order diffracted beam from the region 10 of the polarizing holographic optical element 59 and is focused on the boundary between the light receiving elements 61 and 62, in which the boundary is in parallel to the radial direction R. A light spot L78 corresponds to the plus first order diffracted beam from the region 11 of the polarizing holographic optical element 59 and is focused on the boundary between the light receiving elements 63 and 64, in which the boundary is in parallel to the radial direction R.

A light spot L79 corresponds to the plus first order diffracted beam from the region 12 of the polarizing holographic optical element 59 and is focused on the boundary between the light receiving elements 65 and 66, in which the boundary is in parallel to the radial direction R. A light spot L80 corresponds to the plus first order diffracted beam from the region 13 of the polarizing holographic optical element 59 and is focused on the boundary between the light receiving elements 67 and 68, in which the boundary is in parallel to the radial direction R.

A light spot L81 corresponds to the plus first order diffracted beam from the region 14 of the polarizing holographic optical element 59 and is focused on the boundary between the light receiving elements 69 and 70, in which the boundary is in parallel to the radial direction R. A light spot L82 corresponds to the plus first order diffracted beam from the region 15 of the polarizing holographic optical element 59 and is focused on the boundary between the light receiving elements 71 and 72, in which the boundary is in parallel to the radial direction R.

A light spot L83 corresponds to the plus first order diffracted beam from the region 16 of the polarizing holographic optical element 59 and is focused on the boundary between the light receiving elements 73 and 74, in which the boundary is in parallel to the radial direction R. A light spot L84 corresponds to the plus first order diffracted beam from the region 17 of the polarizing holographic optical element 59 and is focused on the boundary between the light receiving elements 75 and 76, in which the boundary is in parallel to the radial direction R.

More specifically, the light receiving elements 61 and 62 receive the light components of the reflected light from the disk D on one side in the tangential direction T and on one side in the radial direction R of the disk D. The light receiving elements 63 and 64 receive the light components of the reflected light from the disk D on one side in the tangential direction T and on the left half of the intermediate portion in the radial direction R of the disk D. The light receiving elements 65 and 66 receive the light components of the reflected light from the disk D on one side in the tangential direction T and on the right half of the intermediate portion in the radial direction R of the disk D. The light receiving elements 67 and 68 receive the light components of the reflected light from the disk D on one side in the tangential direction T and on the other side in the radial direction R of the disk D.

Moreover, the light receiving elements 69 and 70 receive the light components of the reflected light from the disk D on the other side in the tangential direction T and on one side in the radial direction R of the disk D. The light receiving elements 71 and 72 receive the light components of the reflected light from the disk D on the other side in the tangential direction T and on the left half of the intermediate portion in the radial direction R of the disk D. The light receiving elements 73 and 74 receive the light components of the reflected light from the disk D on the other side in the tangential direction T and on the right half of the intermediate portion in the radial direction R of the disk D. The light receiving elements 75 and 76 receive the light components of the reflected light from the disk D on the other side in the tangential direction T and on the other side in the radial direction R of the disk D.

A semiconductor laser 57 and a mirror 60 are disposed on the front surface of the photodetector 58 at the center thereof. The light emitted from the semiconductor laser 57 is reflected from the mirror 60 and is directed to the disk D.

Next, the signal processing circuit 42B will be described. Each of the above-mentioned light receiving elements 61 to 76 produces an electrical current which is in proportion to the intensity of the light received. The outputs from the light receiving elements 61 to 76 are represented as V61 to V76, respectively. The signal processing circuit 42B calculates a focus error signal using the Foucault method, from the following arithmetic operation:

(V61+V63+V65+V67+V70+V72+V74+V76)−(V62+V64+V66+V68+V69+V71+V73+V75).

The calculation result is supplied to the driving circuit 43. The signal processing circuit 42B also calculates a tracking error signal using the push-pull method, from the following arithmetic operation:

(V61+V62+V63+V64+V69+V70+V71+V72)−(V65+V66+V67+V68+V73+V74+V75+V76).

The calculation result is supplied to the driving circuit 43. Furthermore, the signal processing circuit 42B calculates a playback signal from the following arithmetic operation:

V61+V62+V63+V64+V65+V66+V67+V68+V69+V70+V71+V72+V73+V74+V75+V76.

The calculation result is supplied to, for example, a host system to which the optical information recording/reproducing device 1B is connected.

The signal processing circuit 42B also comprises a tilt signal generating unit 212B that generates, from the output of the photodetector 58, a tangential tilt signal indicative of an amount of tilt of the disk D in the tangential direction T with respect to the objective lens 5. In this event, the tilt signal generating unit 212B calculates the tangential tilt signal from the following arithmetic operation:

(V61+V62+V67+V68+V71+V72+V73+V74)−(V63+V64+V65+V66+V69+V70+V75+V76).

The calculation result is supplied to the driving circuit 43.

In the third embodiment of the optical head assembly according to the present invention, the tangential tilt of the disk D can be detected by using a similar method to the one described in conjunction with FIGS. 4 to 7 in the first embodiment of the optical head assembly according to the present invention.

Therefore, the driving circuit 43 can control operation of the objective lens driving unit 211 in response to the signals supplied from the signal processing circuit 42B to carry out focusing, tracking, and tangential tilt correction.

(Fourth Embodiment)

Figure 14:
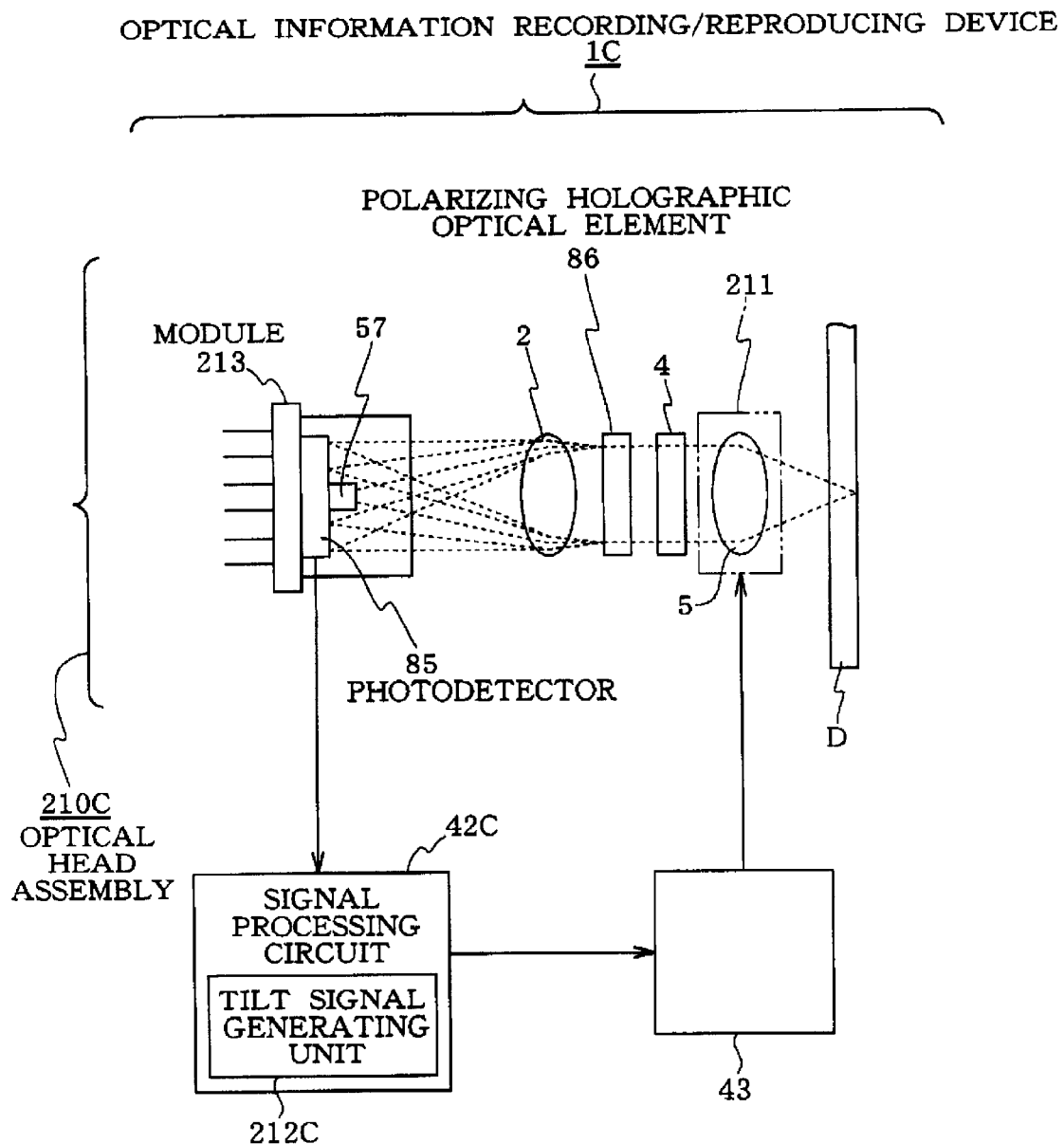
FIG. 14 is a block diagram showing a fourth embodiment of the present invention.

A fourth embodiment of the present invention will be described with reference to FIGS. 14 through 16. Similar components and parts shown in this embodiment to those of the above-mentioned optical information recording/reproducing device 1B are depicted by the same reference numerals and characters, and of which detailed description will be omitted. FIG. 14 shows a block diagram of an optical information recording/reproducing device 1C according to this embodiment.

The optical information recording/reproducing device 1C comprises an optical head assembly 210C, an objective lens driving unit 211 for focusing, tracking, and tangential tilt correction through the objective lens 5 of the optical head assembly 210C, a driving circuit 43 for the objective lens driving unit 211, and a signal processing circuit 42C adapted to generate various signals, in response to outputs from a photodetector 85 of the optical head assembly 210C.

The optical head assembly 210C comprises a semiconductor laser 57 which serves as a light source to provide a laser beam, a collimator lens 2 for converting the light emitted from the semiconductor laser 57 into parallel rays, and a polarizing holographic optical element 86 that transmits the parallel rays.

The optical head assembly 210C also comprises a quarter-wave plate 4 which creates circular polarization from linear polarization with the transmitted light from the polarizing holographic optical element 86, an objective lens 5 which focuses the transmitted light from the quarter-wave plate 4 onto a disk D, and the photodetector 85 which receives, by predetermined multiple-divided light receiving surfaces, the reflected light from the disk D diffracted by the polarizing holographic optical element 86 in the returning path, to produce signals indicative of light intensities. The photodetector 85 is disposed on the midway of the line focuses of the polarizing holographic optical element 86 and the collimator lens 2.

The above-mentioned components of the optical head assembly 210C are aligned with each other from the semiconductor laser 57 to the disk D. Therefore, it is not required to use the polarizing beam splitter 3 used in the optical head assembly 210C. In addition, the semiconductor laser 57 and the photodetector 85 are placed together in a single module 213.

The above-mentioned polarizing holographic optical element 86 transmits, as ordinary rays, almost 100% of the parallel rays from the collimator lens 2. It diffracts, as extraordinary rays, most of the reflected light from the disk D as the plus and minus first order diffracted beams. The polarization direction of the reflected light is perpendicular to that of the outgoing light after being passed through the quarter-wave plate 4 on the outgoing and returning paths.

Figure 15:
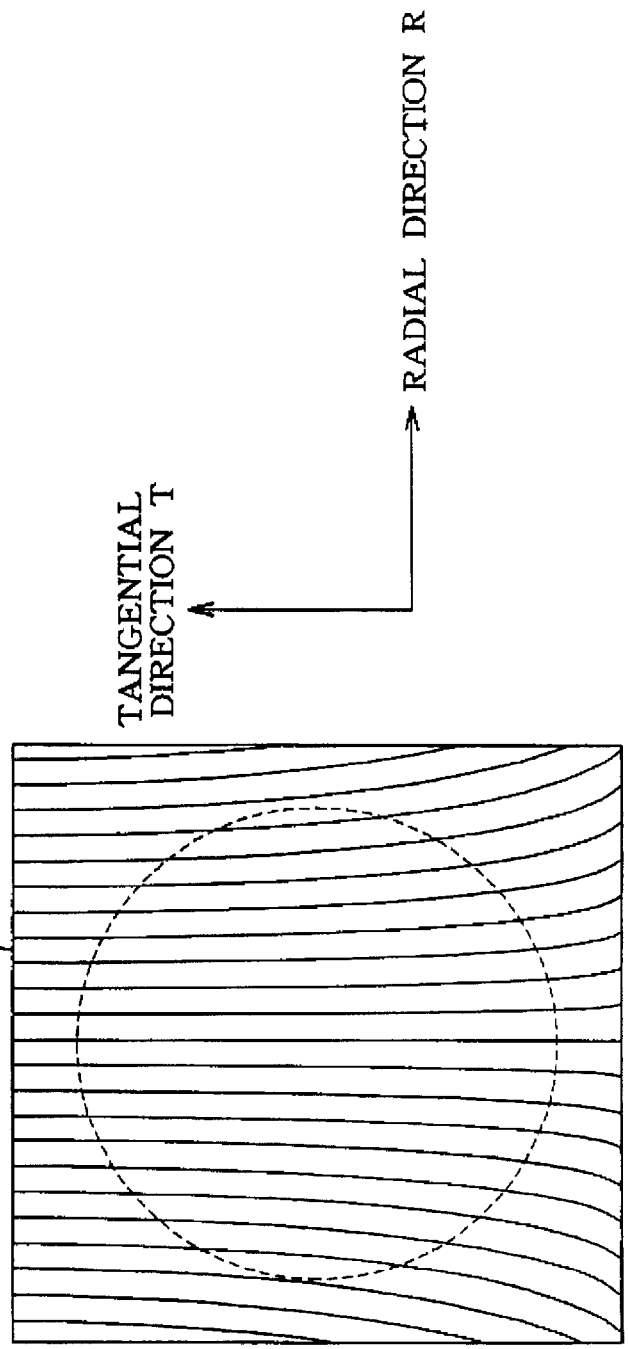
FIG. 15 is a plan view of a polarizing holographic optical element illustrated in FIG. 14.

FIG. 15 is a plan view of the polarizing holographic optical element 86. The polarizing holographic optical element 86 serves as a cylindrical lens to the plus and minus first order diffracted beams. The generating lines of the plus and minus first order diffracted beams are +45 and −45 degrees, respectively, to the radial direction R of the disk D.

The direction of grating in the polarizing holographic optical element 86 is generally in parallel with the tangential direction T of the disk D. A grating pattern describes a hyperbolic curve with the tangential direction T and the radial direction R of the disk D being asymptotic lines. The polarizing holographic optical element 86 has a two-layer grating formed of a proton exchange region and a dielectric film on, for example, a lithium niobate substrate with birefringent properties. A phase difference between the line and space sections of the grating can be defined independently for ordinary rays and extraordinary rays by means of designing the grating with appropriate depth and thickness of the proton exchange region and the dielectric film, respectively. For the outgoing ordinary rays, when the phase difference between the line and space sections of the grating is zero, almost 100% of the incident light is transmitted. For the returning extraordinary rays, when the phase difference between the line and space sections of the grating is $\pi$, about 40.5% of the incident light is diffracted as the plus and minus first order diffracted beams.

Figure 16:
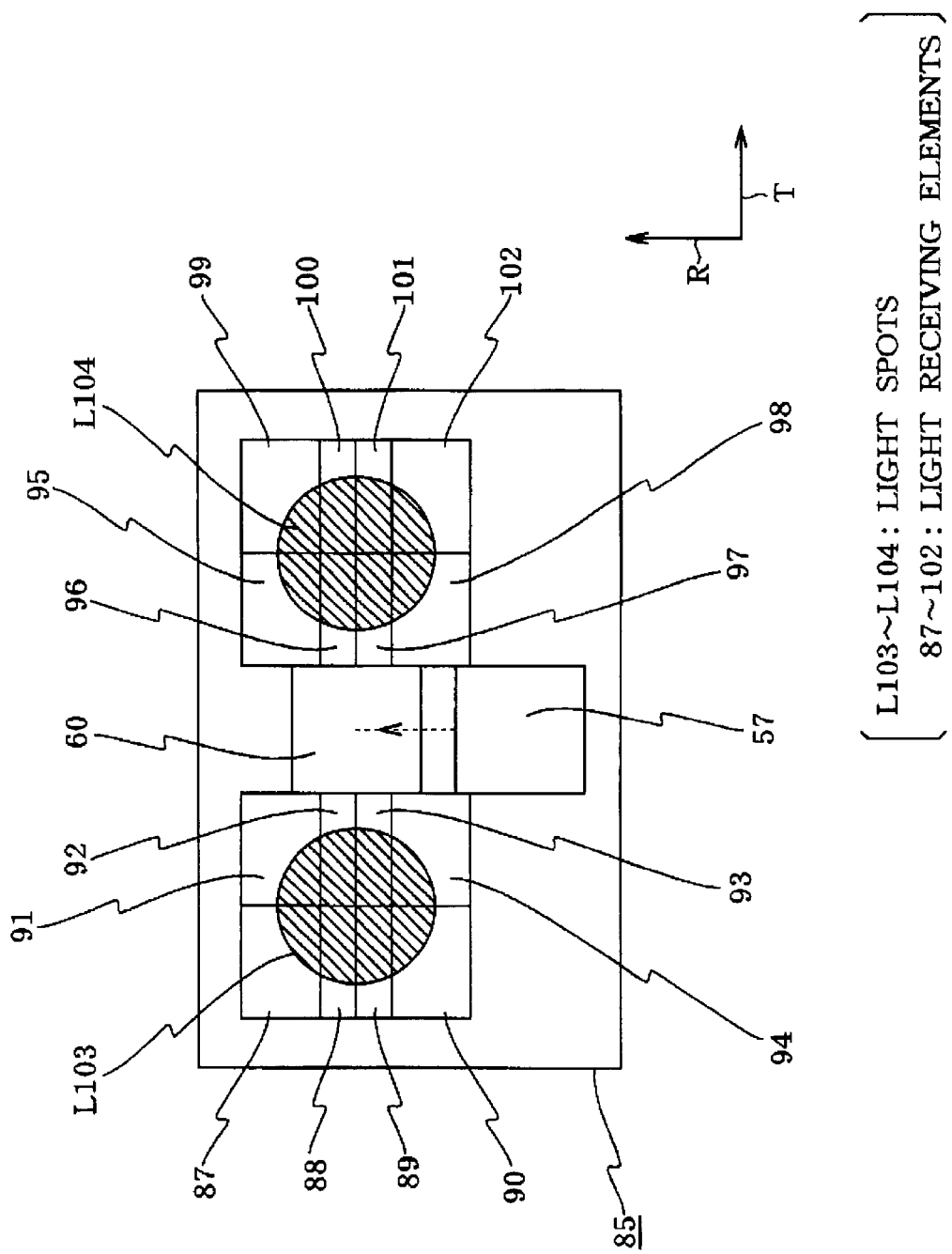
FIG. 16 is a front view showing location of light spots on a photodetector illustrated in FIG. 14 and light receiving elements thereof.
Figure 17:
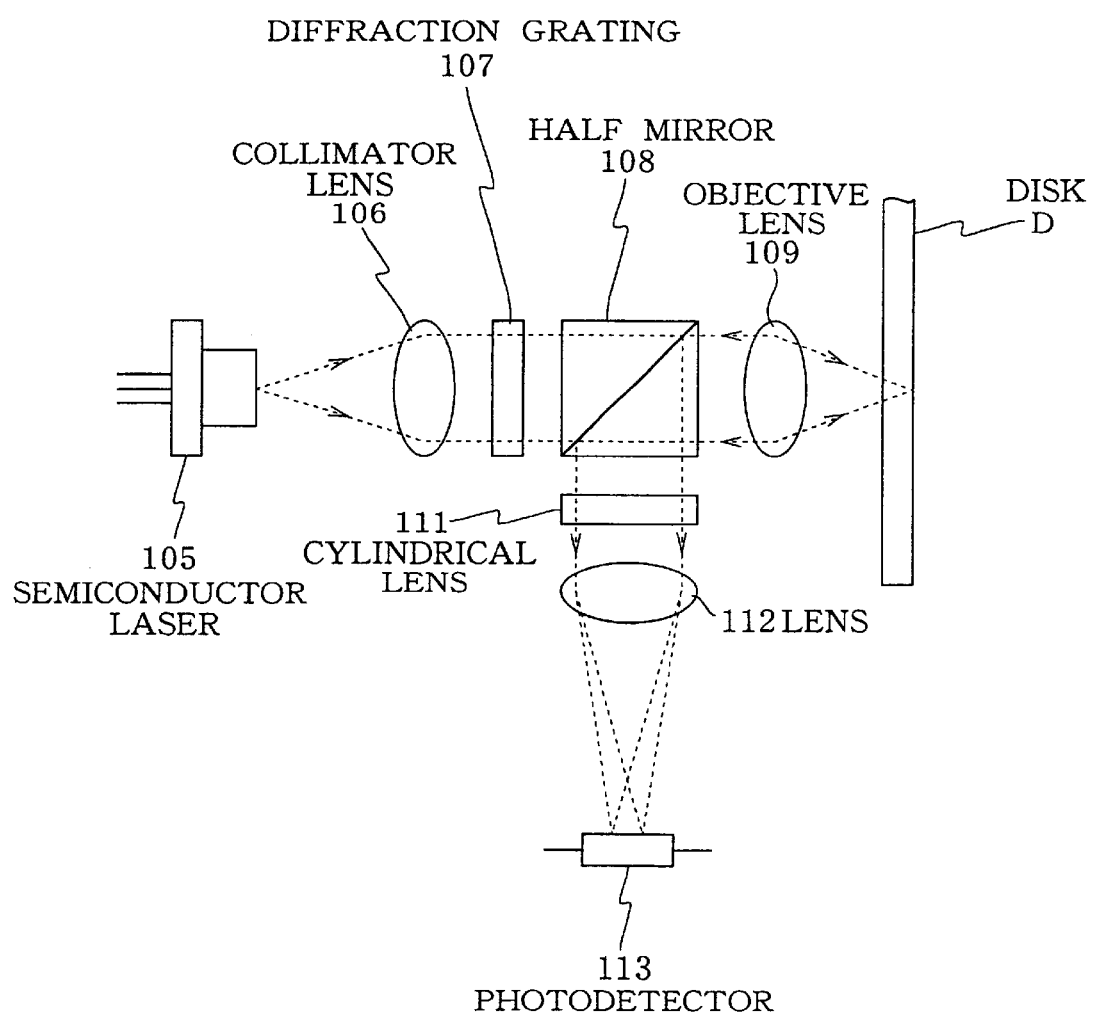
FIG. 17 is a block diagram showing a prior art.
Figure 18:
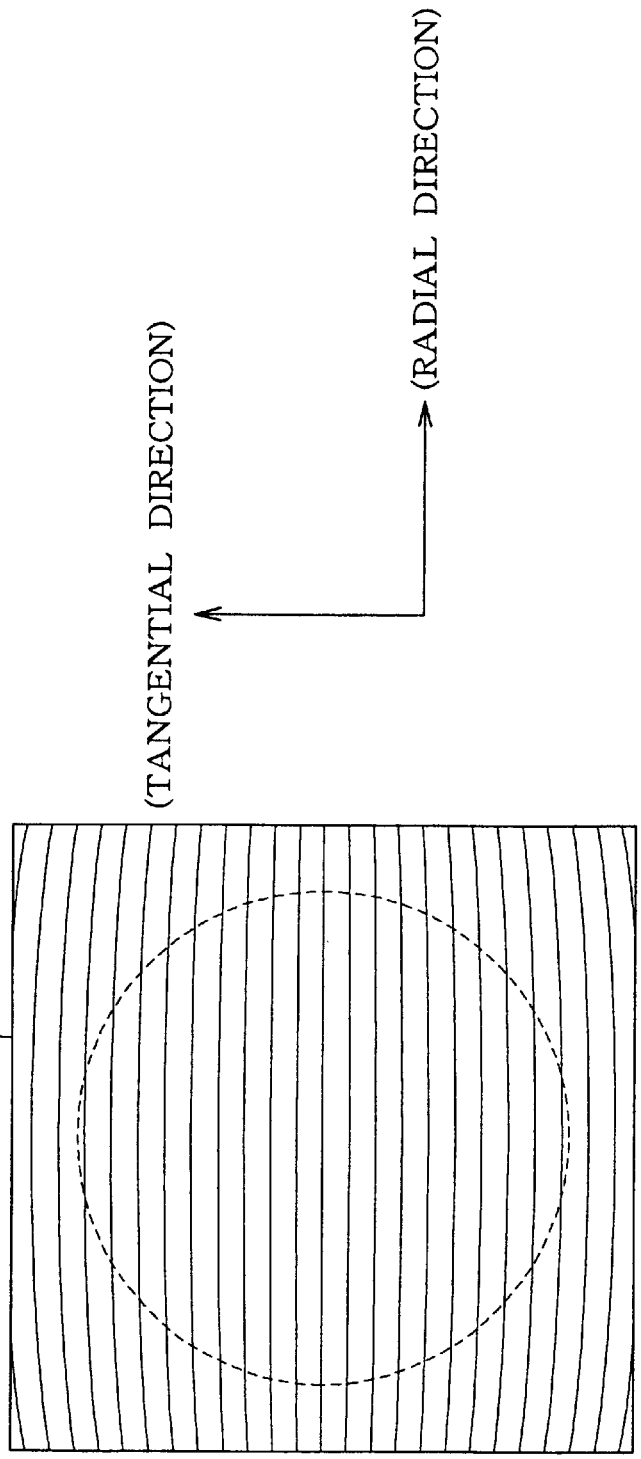
FIG. 18 is a plan view of a diffraction grating illustrated in FIG. 17.
Figure 19:
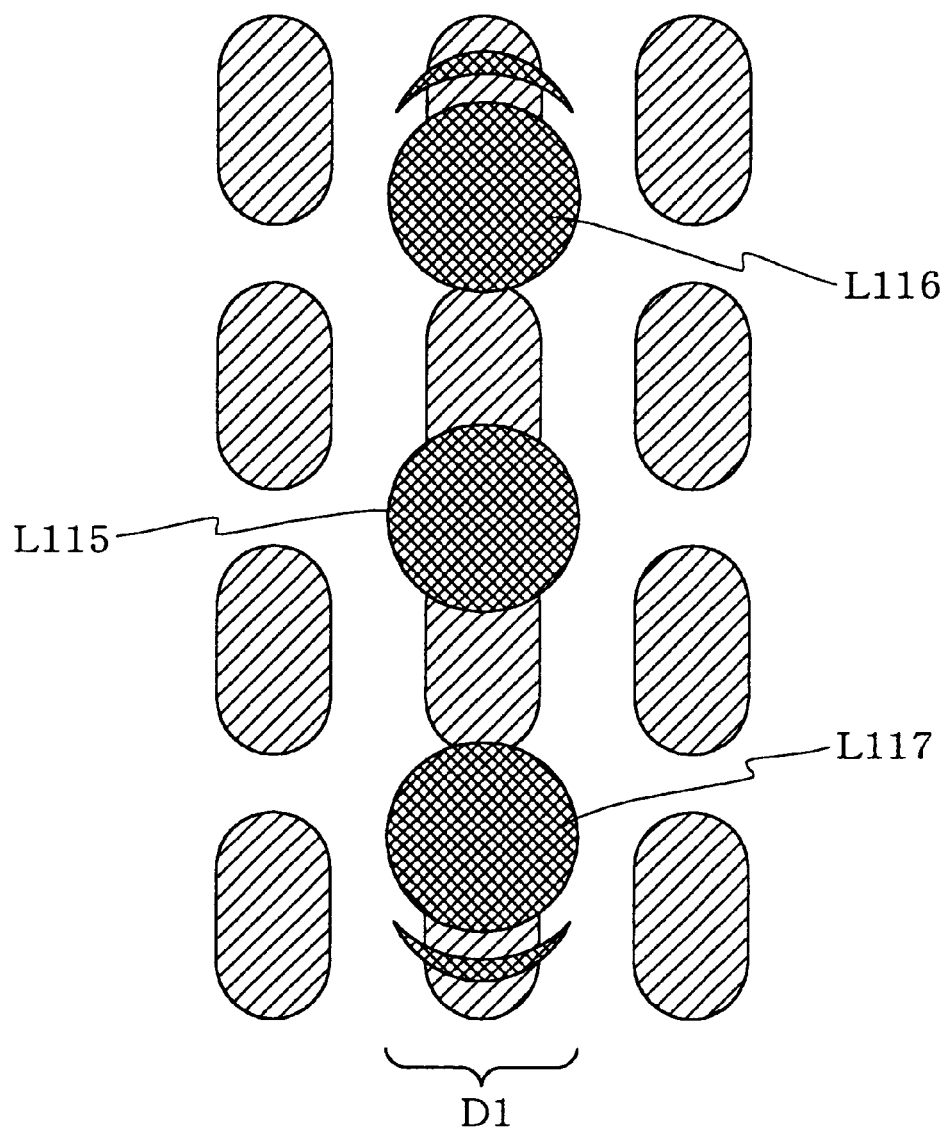
FIG. 19 is a view for use in describing location of focused light spots on a disk in a conventional optical head assembly.
Figure 20:
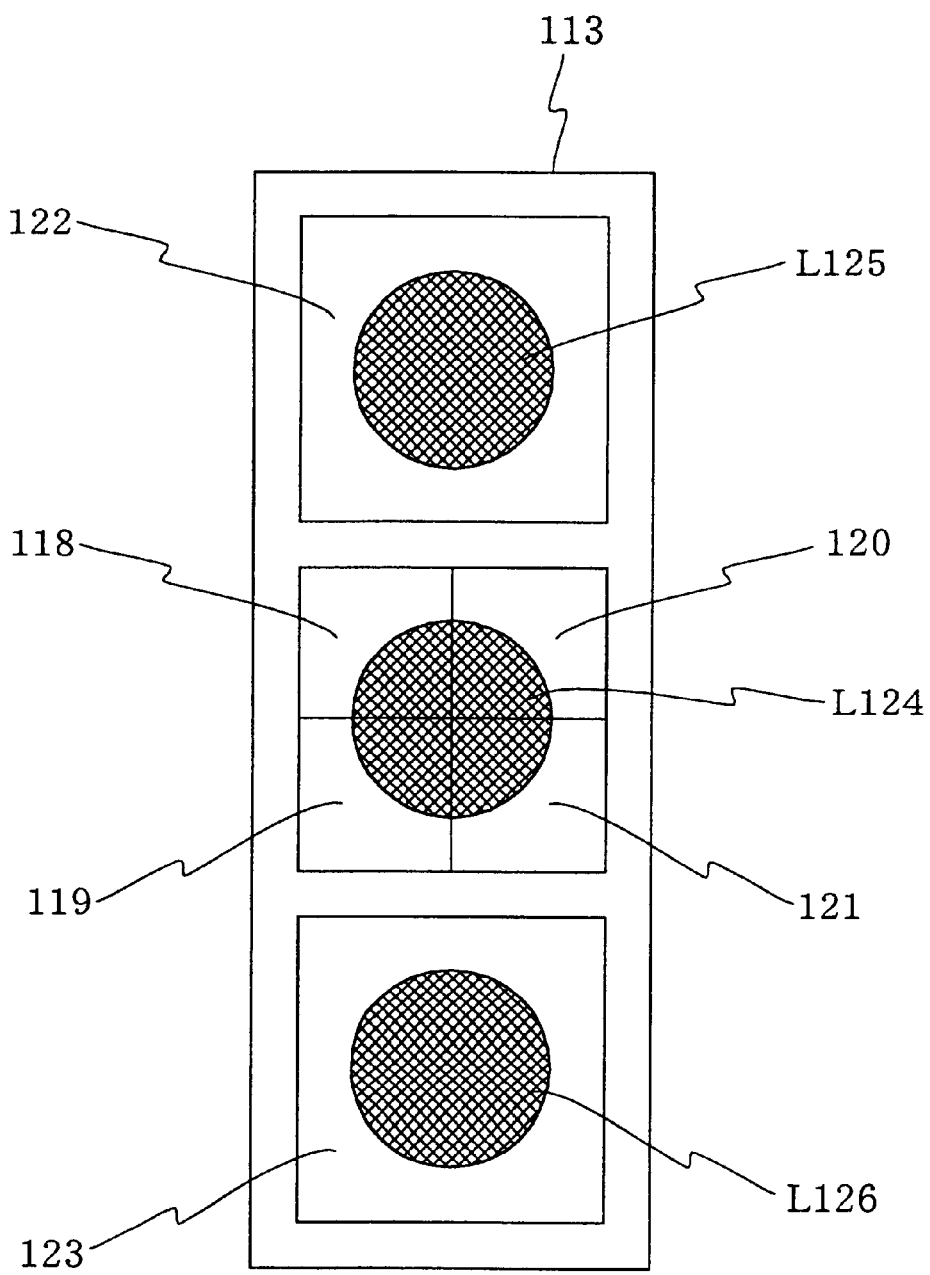
FIG. 20 is a front view showing location of light spots on a photodetector illustrated in FIG. 17 and light receiving elements thereof.

FIG. 16 shows a pattern of the light receiving elements of the photodetector 85 and location of light spots on the photodetector 85. Among light receiving elements of the photodetector 85, light receiving elements 87 to 94 receive the plus first order diffracted beam (light spot L103) obtained by the polarizing holographic optical element 86 while light receiving elements 95 to 102 receive the minus first order diffracted beam (light spot L104) obtained by the polarizing holographic optical element 86.

The photodetector 85 comprises the light receiving elements 87 to 94 formed by dividing, into eight segments, a photoreceiving surface to receive the light spot L103 by three dividing lines which are in parallel with the tangential direction T of the disk D, and a single dividing line which is perpendicular thereto and is in parallel with the radial direction R of the disk D. Likewise, the photodetector 85 comprises the light receiving elements 95 to 102 formed by dividing, into eight segments, a photoreceiving surface to receive the light spot L104 by three dividing lines which are in parallel with the tangential direction T of the disk D, and a single dividing line which is perpendicular thereto and is in parallel with the radial direction R of the disk D.

The up-and-down direction of the figure corresponds to the tangential direction T for the focused light spot on the disk D. However, the up-and-down direction of the figure corresponds to the radial direction R for the light spots L103 and L104 on the photodetector 85 due to an effect of the polarizing holographic optical element 86 and the collimator lens 2. The two generating lines of the plus and minus first order diffracted beams from the polarizing holographic optical element 86 are perpendicular to each other. Thus, the light spots L103 and L104 have opposite patterns of intensity distribution relative to the up-and-down and side-to-side directions.

Accordingly, the light receiving element 91 (98) receives the light component of the reflected light from the disk D on one side in the tangential direction T and on one side in the radial direction R of the disk D. The light receiving element 92 (97) receives the light component of the reflected light from the disk D on one side in the tangential direction T and on a half of the intermediate portion in the radial direction R of the disk D. The light receiving element 93 (96) receives the light component of the reflected light from the disk D on one side in the tangential direction T and on another half of the intermediate portion in the radial direction R of the disk D. The light receiving element 94 (95) receives the light component of the reflected light from the disk D on one side in the tangential direction T and on the other side in the radial direction R of the disk D.

Moreover, the light receiving element 87 (102) receives the light component of the reflected light from the disk D on the other side in the tangential direction T and on one side in the radial direction R of the disk D. The light receiving element 88 (101) receives the light component of the reflected light from the disk D on the other side in the tangential direction T and on a half of the intermediate portion in the radial direction R of the disk D. The light receiving element 89 (100) receives the light component of the reflected light from the disk D on the other side in the tangential direction T and on another half of the intermediate portion in the radial direction R of the disk D. The light receiving element 90 (99) receives the light component of the reflected light from the disk D on the other side in the tangential direction T and on the other side in the radial direction R of the disk D.

A semiconductor laser 57 and a mirror 60 are disposed on the front surface of the photodetector 85 at the center thereof. The light emitted from the semiconductor laser 57 is reflected from the mirror 60 and is directed to the disk D.

Next, the signal processing circuit 42C will be described. Each of the light receiving elements 87 to 102 of the photodetector 85 produces an electrical current depending on the intensity of the light received. The outputs from the light receiving elements 87 to 102 are represented as V87 to V102, respectively. The signal processing circuit 42C calculates a focus error signal using the astigmatic method, from the following arithmetic operation:

(V87+V88+V93+V94+V97+V98+V99+V100)−(V89+V90+V91+V92+V95+V96+V101+V102).

The calculation result is supplied to the driving circuit 43. The signal processing circuit 42C also calculates a tracking error signal using the push-pull method, from the following arithmetic operation:

(V87+V88+V91+V92+V97+V98+V101+V102)−(V89+V90+V93+V94+V95+V96+V99+V100).

The calculation result is supplied to the driving circuit 43. Furthermore, the signal processing circuit 42C calculates a playback signal from the following arithmetic operation:

V87+V88+V89+V90+V91+V92+V93+V94+V95+V96+V97+V98+V99+V100+V101+V102.

The calculation result is supplied to, for example, a host system to which the optical information recording/reproducing device 1C is connected.

The signal processing circuit 42C also comprises a tilt signal generating unit 212C that generates a tangential tilt signal. In this event, the tilt signal generating unit 212C calculates the tangential tilt signal from the following arithmetic operation:

(V87+V90+V92+V93+V96+V97+V99+V102)−(V88+V89+V91+V94+V95+V98+V100+V101).

The calculation result is supplied to the driving circuit 43.

In the fourth embodiment of the optical head assembly according to the present invention, the tangential tilt of the disk D can be detected by using a similar method to the one described in conjunction with FIGS. 4 to 7 in the first embodiment of the optical head assembly according to the present invention.

Therefore, the driving circuit 43 can control operation of the objective lens driving unit 211 in response to the signals supplied from the signal processing circuit 42C to carry out focusing, tracking, and tangential tilt correction.

In the present invention, the optical head assembly comprises a photodetector having light receiving elements each of which individually receive the light reflected from the optical recording medium, for the region on one side in the tangential direction of the optical recording medium and on both sides in the radial direction of the optical recording medium, the regions on one side in the tangential direction of the optical recording medium and intermediate in the radial direction of the optical recording medium, the regions on the other side in the tangential direction of the optical recording medium and on both sides in the radial direction of the optical recording medium, and the regions on the other side in the tangential direction of the optical recording medium and intermediate in the radial direction of the optical recording medium.

Accordingly, unlike detection of the tangential tilt using the plus and minus first order diffracted beams supplied from the diffraction grating, which otherwise is required conventionally, the present invention allows detection of the tangential tilt using the regions where the zero order beam from the optical recording medium is overlapped with the plus and minus first order diffracted beams for generation of the tangential tilt signal. This improves the sensitivity of the detection.

In addition, the present invention detects the tangential tilt based on the above-mentioned components of the reflected light from the optical recording medium. Therefore, it is not necessary to measure the bit error rates of the playback signal, which otherwise is required conventionally. The tangential tilt can be detected efficiently with the recordable and rewritable optical recording media as well as the optical recording media for playback only where certain signals are recorded previously.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-113556 (Filed on Apr. 14, 2000) including specification, claims, drawings and summary are incorporated herein by reference in its entirety.

What is claimed is:

1. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to a difference between a sum of the outputs of the light receiving elements that receive the light components of the reflected light directed to the regions on one side in the tangential direction of the optical recording medium, the regions being on both sides in the radial direction of the optical recording medium and the light components of the reflected light directed to the regions on the other side in the tangential direction of the optical recording medium, the regions being intermediate in the radial direction of the optical recording medium, and a sum of the outputs of the light receiving elements that receive the light components of the reflected light directed to the regions on one side in the tangential direction of the optical recording medium, the regions being intermediate in the radial direction of the optical recording medium and the light components of the reflected light directed to the regions on the other side in the tangential direction of the optical recording medium, the regions being on both sides in the radial direction of the optical recording medium, the tangential tilt signal being indicative of an amount of tilt of the optical recording medium in the tangential direction with respect to said objective lens.

2. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium: and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to a difference between the output of the light receiving element that receives the light component of the reflected light directed to the regions on one side in the tangential direction of the optical recording medium, the regions being on both sides in the radial direction of the optical recording medium, and the output of the light receiving element that receives the light component of the reflected light directed to the regions on one side in the tangential direction of the optical recording medium, the regions being intermediate in the radial direction of the optical recording medium, the tangential tilt signal being indicative of an amount of tilt of the optical recording medium in the tangential direction with respect to said objective lens.

3. An optical head assembly comprising:

a light source;

an objective lens which focuses transmitted light from said light source onto an optical recording medium;

a photodetector adapted to receive reflected light from the optical recording medium, 0 wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium: light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to a difference between the output of the light receiving element that receives the light component of the reflected light directed to the regions on the other side in the tangential direction of the optical recording medium, the regions being intermediate in the radial direction of the optical recording medium, and the output of the light receiving element that receives the light component of the reflected light directed to the regions on the other side in the tangential direction of the optical recording medium, the regions being on both sides in the radial direction of the optical recording medium, the tangential tilt signal being indicative of an amount of tilt of the optical recording medium in the tangential direction with respect to said objective lens.

4. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to a sum of the output of the light receiving element that receives the light component of the reflected light directed to the regions on one side in the tangential direction of the optical recording medium, the regions being on both sides in the radial direction of the optical recording medium, and the output of the light receiving element that receives the light component of the reflected light directed to the regions on the other side in the tangential direction of the optical recording medium, the regions being intermediate in the radial direction of the optical recording medium, the tangential tilt signal being indicative of an amount of tilt of the optical recording medium in the tangential direction with respect to said objective lens.

5. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to a sum of the output of the light receiving element that receives the light component of the reflected light directed to the regions on one side in the tangential direction of the optical recording medium, the regions being intermediate in the radial direction of the optical recording medium, and the output of the light receiving element that receives the light component of the reflected light directed to the regions on the other side in the tangential direction of the optical recording medium, the regions being on both sides in the radial direction of the optical recording medium, the tangential tilt signal being indicative of an amount of tilt of the optical recording medium in the tangential direction with respect to said objective lens.

6. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium: and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal according to the output of the light receiving element that receives the light component of the reflected light directed to the regions on one side in the tangential direction of the optical recording medium, the regions being on both sides in the radial direction of the optical recording medium, the tangential tilt signal being indicative of an amount of tilt of the optical recording medium in the tangential direction with respect to said objective lens.

7. An optical head assembly comprising:

a light source;

an objective lens which focuses transmitted light from said light source onto an optical recording medium;

a photodetector adapted to receive reflected light from the optical recording medium;

wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, according to the outputs of said photodetector, wherein said signal processing circuit comprises a tilt signal generating unit for generating a tangential tilt signal according to the output of the light receiving element that receives the light component of the reflected light directed to the regions on one side in the tangential direction of the optical recording medium, the regions being intermediate in the radial direction of the optical recording medium, the tangential tilt signal being indicative of an amount of tilt of the optical recording medium in the tangential direction with respect to said objective lens.

8. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium: light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal in response to the output of the light receiving element that receives the light component of the reflected light directed to the regions on the other side in the tangential direction of the optical recording medium, the regions being on both sides in the radial direction of the optical recording medium, the tangential tilt signal being indicative of an amount of tilt of the optical recording medium in the tangential direction with respect to said objective lens.

9. An optical head assembly comprising:

a light source;

an objective lens which focuses transmitted light from said light source onto an optical recording medium;

a photodetector adapted to receive reflected light from the optical recording medium, wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium; light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and a signal processing circuit for use in generating a focus error signal, a tracking error signal, and a playback signal, in response to the outputs of said photodetector, wherein said signal processing circuit comprises a tilt signal generating unit for generating a tangential tilt signal in response to the output of the light receiving element that receives the light component of the reflected light directed to the regions on the other side in the tangential direction of the optical recording medium, the regions being intermediate in the radial direction of the optical recording medium, the tangential tilt signal being indicative of an amount of tilt of the optical recording medium in the tangential direction with respect to said objective lens.

10. The optical head assembly according to claim 1, wherein the tilt signal generating unit is provided with zero point correction means for the tangential tilt signal.

11. An optical information recording/reproducing device comprising:

an optical head assembly comprising:
  a light source;
  an objective lens which focuses transmitted light from said light source onto an optical recording medium;
  a photodetector adapted to receive reflected light from the optical recording medium,
  wherein said photodetector has light receiving elements, each light receiving element individually receiving light components of the reflected light directed to regions on one side in the tangential direction of the optical recording medium, the regions being on both sides in the radial direction of the optical recording medium; light components of the reflected light directed to regions on the other side in the tangential direction of the optical recording medium, the regions being intermediate in the radial direction of the optical recording medium: light components of the reflected light directed to regions on one side in the tangential direction of the optical recording medium, the regions being intermediate in the radial direction of the optical recording medium; and light components of the reflected light directed to regions on the other side in the tangential direction of the optical recording medium, the regions being on both sides in the radial direction of the optical recording medium; and
  a signal processing circuit for use in generating a focus error signal, a tracking error signal, and a playback signal, in response to the outputs of said photodetector,
  wherein said signal processing circuit comprises a tilt signal generating unit for generating a tangential tilt signal according to a difference between a sum of the outputs of the light receiving elements that receive the light components of the reflected light directed to the regions on one side in the tangential direction of the optical recording medium, the regions being on both sides in the radial direction of the optical recording medium and the light components of the reflected light directed to the regions on the other side in the tangential direction of the optical recording medium, the regions being intermediate in the radial direction of the optical recording medium, and a sum of the outputs of the light receiving elements that receive the light components of the reflected light directed to the regions on one side in the tangential direction of the optical recording medium, the regions being intermediate in the radial direction of the optical recording medium and the light components of the reflected light directed to the regions on the other side in the tangential direction of the optical recording medium, the regions being on both sides in the radial direction of the optical recording medium, the tangential tilt signal being indicative of an amount of tilt of the optical recording medium in the tangential direction with respect to said objective lens;
  tilt correction means for correcting a tilt of the optical recording medium in the tangential direction with respect to said objective lens; and
  a driving circuit for use in controlling operation of said tilt correction means in response to the tangential tilt signal.

12. The optical information recording/reproducing device according to claim 11, wherein said signal processing circuit has a land/groove switching function to determine, in response to the outputs of said photodetector, whether the focused light spots of the light emitted from said light source on the optical recording medium are located on the lands or on the grooves and to switch, based on the determination result, polarity of said driving circuit for driving said tilt correction means.

13. The optical information recording/reproducing device according to claim 11, wherein said tilt correction means is for correcting the tilt of the optical recording medium in the tangential direction with respect to said objective lens by means of tilting said objective lens in the tangential direction of the optical recording medium.

14. The optical information recording/reproducing device according to claim 11, wherein said tilt correction means is for correcting the tilt of the optical recording medium in the tangential direction with respect to said objective lens by means of tilting, as a group, the components of the optical head assembly which comprises at least said light source and said photodetector, the components being on the paths of the light emitted from said light source and of the light reflected from the optical recording medium, the optical head assembly.

15. The optical information recording/reproducing device according to claim 11, wherein said tilt correction means is provided on the path of the light emitted from said light source, said tilt correction means being a liquid crystal optical element that causes a predetermined coma aberration to be generated with the light emitted from said light source.

* * * * *